United States Patent
Mourtazov et al.

(10) Patent No.: US 10,220,593 B2
(45) Date of Patent: Mar. 5, 2019

(54) COMPOSITE MATERIAL INCORPORATING WATER INGRESS BARRIER

(71) Applicant: LEARJET INC., Wichita, KS (US)

(72) Inventors: Khassan Mourtazov, Saint-Laurent (CA); Pierre Drolet, Ville St-Laurent (CA); Pierre Harter, Wichita, KS (US); David Wilson, Pierrefonds (CA)

(73) Assignee: LEARJET INC., Wichita, KS (US)

( * ) Notice: Subject to any disclaimer, the term of this patent is extended or adjusted under 35 U.S.C. 154(b) by 107 days.

(21) Appl. No.: 14/907,317

(22) PCT Filed: Jul. 1, 2014

(86) PCT No.: PCT/US2014/045055
§ 371 (c)(1),
(2) Date: Jan. 25, 2016

(87) PCT Pub. No.: WO2015/013012
PCT Pub. Date: Jan. 29, 2015

(65) Prior Publication Data
US 2016/0167332 A1    Jun. 16, 2016

Related U.S. Application Data

(60) Provisional application No. 61/858,967, filed on Jul. 26, 2013.

(51) Int. Cl.
*B32B 3/12* (2006.01)
*B29D 99/00* (2010.01)
(Continued)

(52) U.S. Cl.
CPC ............ *B32B 3/12* (2013.01); *B29D 99/0021* (2013.01); *B32B 5/022* (2013.01); *B32B 5/024* (2013.01);
(Continued)

(58) Field of Classification Search
USPC ................................... 428/73, 116
See application file for complete search history.

(56) References Cited

U.S. PATENT DOCUMENTS

| 5,041,321 | A | 8/1991 | Bendig |
| 5,122,176 | A | 6/1992 | Geottler |

(Continued)

FOREIGN PATENT DOCUMENTS

| CN | 101336161 A | 12/2008 |
| CN | 101980860 A | 2/2011 |

(Continued)

OTHER PUBLICATIONS

Henkel Hysol® EA 9695 Epoxy Film Adhesive Data Sheet (Year: 2001).*

(Continued)

*Primary Examiner* — Lauren R Colgan
(74) *Attorney, Agent, or Firm* — Karceski IP Law, PLLC

(57) ABSTRACT

A composite material includes a honeycomb layer with top and bottom sides. The honeycomb layer includes a plurality of walls defining a plurality of cells therein. A first adhesive layer is disposed adjacent to the top side of the honeycomb layer. A second adhesive layer is disposed adjacent to the bottom side of the honeycomb layer. A third adhesive layer is disposed adjacent to the first adhesive layer on the top side of the honeycomb layer. A first composite layer is disposed adjacent to the third adhesive layer on the top side of the honeycomb layer. A second composite layer is disposed adjacent to the second adhesive layer on the bottom side of the honey comb layer. At least the third adhesive layer comprises viscous properties that discourage the creation of channels within the first composite layer when co-cured.

26 Claims, 10 Drawing Sheets

(51) Int. Cl.
- *B32B 37/14* (2006.01)
- *B32B 37/12* (2006.01)
- *B32B 5/02* (2006.01)
- *B32B 5/26* (2006.01)
- *B32B 7/10* (2006.01)
- *B32B 7/12* (2006.01)
- *B32B 38/00* (2006.01)

(52) U.S. Cl.
CPC ............... *B32B 5/26* (2013.01); *B32B 7/10* (2013.01); *B32B 7/12* (2013.01); *B32B 37/12* (2013.01); *B32B 37/146* (2013.01); B32B 2038/0076 (2013.01); B32B 2262/0269 (2013.01); B32B 2262/106 (2013.01); B32B 2307/54 (2013.01); B32B 2307/542 (2013.01); B32B 2307/714 (2013.01); B32B 2605/00 (2013.01); B32B 2605/08 (2013.01); B32B 2605/12 (2013.01); B32B 2605/18 (2013.01)

(56) References Cited

U.S. PATENT DOCUMENTS

| | | |
|---|---|---|
| 5,356,688 A | 10/1994 | MacLean et al. |
| 5,624,728 A | 4/1997 | Hoopingarner et al. |
| 5,683,646 A | 11/1997 | Reiling, Jr. |
| 5,685,940 A | 11/1997 | Hopkins et al. |
| 5,698,153 A | 12/1997 | Hoppingarner et al. |
| 5,707,723 A | 1/1998 | Harrison et al. |
| 5,747,179 A | 5/1998 | Matsen et al. |
| 5,785,919 A | 7/1998 | Wilson |
| 5,806,796 A | 9/1998 | Healey |
| 5,882,246 A | 3/1999 | Inkyo et al. |
| 5,895,699 A | 4/1999 | Corbett et al. |
| 5,955,197 A | 9/1999 | Skowronski et al. |
| 6,035,531 A | 3/2000 | Besse et al. |
| 6,056,838 A | 5/2000 | Besse et al. |
| 6,149,776 A | 11/2000 | Tang et al. |
| 6,180,206 B1 | 1/2001 | Kain, Jr. |
| 6,251,497 B1 | 6/2001 | Hoopingarner et al. |
| 6,371,242 B1 | 4/2002 | Wilson et al. |
| 6,418,973 B1 | 7/2002 | Cox et al. |
| 6,465,100 B1 | 10/2002 | Johnson, III et al. |
| 6,499,926 B2 | 12/2002 | Keener |
| 6,679,969 B1 | 1/2004 | Fournier et al. |
| 6,698,484 B1 | 3/2004 | Corbett et al. |
| 6,756,126 B2 | 6/2004 | Oguri et al. |
| 6,790,531 B2 | 9/2004 | Fournier |
| 6,897,419 B1 | 5/2005 | Brown et al. |
| 7,021,358 B2 | 4/2006 | Landi et al. |
| 7,138,031 B2 | 11/2006 | Erickson et al. |
| 7,163,654 B2 | 1/2007 | Landi et al. |
| 7,413,694 B2 | 8/2008 | Waldrop, III et al. |
| 7,488,371 B2 | 2/2009 | Lippert et al. |
| 7,501,363 B2 | 3/2009 | Dharmadhikary et al. |
| 7,513,184 B2 | 4/2009 | Kister |
| 7,608,213 B2 | 10/2009 | Bergsma et al. |
| 7,633,040 B2 | 12/2009 | Glain et al. |
| 7,666,493 B2 | 2/2010 | Endres et al. |
| 7,690,911 B2 | 4/2010 | Haney |
| 7,712,993 B2 | 5/2010 | Frisch et al. |
| 2005/0123717 A1 | 6/2005 | Shen et al. |
| 2009/0072086 A1* | 3/2009 | Smith .................. B32B 3/12 244/119 |
| 2009/0252921 A1* | 10/2009 | Bottler .................. B29C 70/086 428/116 |
| 2013/0079434 A1 | 3/2013 | Castagnet et al. |

FOREIGN PATENT DOCUMENTS

| | | |
|---|---|---|
| CN | 102555302 A | 7/2012 |
| CN | 102917863 A | 2/2013 |
| DE | 202008012572 U1 | 12/2008 |
| EP | 0359614 A1 | 3/1990 |
| EP | 0586000 A1 | 3/1994 |
| EP | 0757622 | 11/1995 |
| EP | 0722825 A2 | 7/1996 |
| EP | 0730951 A1 | 9/1996 |
| EP | 0733731 A1 | 9/1996 |
| EP | 0833733 | 11/1996 |
| EP | 0786330 A2 | 7/1997 |
| EP | 1005978 A2 | 6/2000 |
| EP | 1086801 A1 | 3/2001 |
| EP | 1235672 | 6/2001 |
| EP | 1281613 A2 | 2/2003 |
| EP | 1469986 | 8/2003 |
| EP | 1469987 | 8/2003 |
| EP | 1542857 | 4/2004 |
| EP | 1948425 | 5/2007 |
| JP | H01123729 A | 1/1999 |
| WO | 9529807 | 11/1995 |
| WO | WO 9725198 | 7/1997 |

OTHER PUBLICATIONS

Dalip K. Kohli, Improved 121° C. Curing Epoxy Film Adhesive for Composite Bonding and Repair Applications: FM® 300-2 Adhesive System, 19 Int'l J. Adhesion & Adhesives 231 (Year: 1999).*

Chinese Office Action dated May 10, 2017, for Chinese Patent Application No. 201480042203.5.

International Search Report and Written Opinion dated Sep. 29, 2014, for International Patent Application No. PCT/US2014/045055.

Chinese Office Action dated Sep. 5, 2016, for Chinese Patent Application No. 201480042203.5.

International Preliminary Report on Patentability dated Feb. 4, 2016, for International Patent Application No. PCT/US2014/045055.

Chinese Office Action dated Sep. 29, 2017, for Chinese Patent Application No. 201480042203.5.

Chinese Office Action dated Mar. 13, 2018, for Chinese Patent Application No. 201480042203.5.

* cited by examiner

COMPOSITE MATERIAL INCORPORATING WATER INGRESS BARRIER

CROSS-REFERENCE TO RELATED APPLICATION(S)

This is a National Stage Entry into the United States Patent and Trademark Office from International PCT Patent Application No. PCT/US2014/045055, having an international filing date of Jul. 1, 2014, which relies for priority on U.S. Provisional Patent Application Ser. No. 61/858,967, entitled "COMPOSITE MATERIAL INCORPORATING WATER INGRESS BARRIER," filed Jul. 26, 2013, the contents of both of which are hereby incorporated by reference in their entirety.

FIELD OF THE INVENTION

The present invention concerns a construction for a composite material incorporating a water ingress barrier. More specifically, the present invention concerns a composite material that may be used in the construction of aircraft, where the composite material includes a honeycomb core construction sandwiched by composite fabric layers.

DESCRIPTION OF THE RELATED ART

Traditionally, aircraft have been manufactured from metal materials. In particular, aircraft traditionally have been made from alloys of aluminum, which is both strong and lightweight.

In recent years, a preference has developed for the construction of aircraft and aircraft parts that incorporate composite materials. Composite materials tend to be lighter in weight than their metallic counterparts in many instances. In addition, composite materials tend to be stronger than their metallic counterparts in many instances.

The term "composite material" encompasses a wide variety of different materials. When discussing composite materials that are used in the construction of aircraft and their associated parts and components, there are at least two types of composite materials that are commonly employed by the prior art. The first composite material often is referred to as a "monolithic" composite material. Monolithic composite materials include a plurality of layers of unidirectional fiber fabric (glass, carbon, etc.) that are molded together in the presence of a resin to form a unitary structure. The second composite material often is referred to as a "honeycomb" composite material, because it typically includes a honeycomb material sandwiched between layers of carbon fiber fabric. As in the case of the monolithic composite material, the honeycomb material and the layers of carbon fiber fabric are molded together in the presence of resin to form a unitary structure.

With respect to the honeycomb composite material, the honeycomb layer (as with many honeycomb materials) is very strong but very light weight. As should be apparent to those skilled in the art, honeycomb materials most commonly include small, hexagonally-shaped air pockets. These air pockets reduce the weight of the material that incorporate the honeycomb, which is one reason why honeycomb materials are used in composite materials. These air pockets, however, present loci where water, in the form of vapor or liquid, may collect during or after the construction of the honeycomb composite material.

As discussed in greater detail below, there are a number of mechanisms that may contribute to the presence of water in a honeycomb material. Two primary mechanisms include: (1) entrapment of water, air, and volatiles in the composite material during manufacture of the material (including post-curing of non-metallic phenolic honeycomb), and (2) ingress of water during the service life of the composite material due to crack development while in service. While both mechanisms are potentially problematic, the second mechanism may be particularly problematic, especially given the long service lives designed for modern aircraft.

During construction of a honeycomb composite material, to cure the resin in the material, the honeycomb composite material is subjected to elevated temperatures. While this process may drive some water, air, and volatiles out of the composite material, it is possible that some materials, particularly water, may be retained. This water may establish a locus from which progressive deterioration of the composite material may be initiated.

Separately, cracks (also referred to as "fractures") may be introduced into the composite material during the manufacture of the composite material. As used herein, the term "crack" is intended to encompass, but is not limited to, micro-cracks, fractures, micro-fractures, pores, micro-pores, porous air passages, voids, micro-voids, pathways, micro-pathways, passages, micro-passages, weakened zones, etc. It is understood that the presence of water, air, and volatiles in the composite material may try to escape from the material during the curing process. As they try to escape, water, air, and volatiles may establish cracks in the composite material that become a permanent part of the composite material after the curing process is complete.

In addition, cracks may develop in the composite material during the service life of the material. Cracks may be created, for example, due to an impact or other force(s) on the composite material.

Cracks present loci where water may enter into the material and subsequently condense and/or collect in the cells within the honeycomb. As should be apparent from the foregoing, water that collects in the honeycomb may establish a locus from which progressive deterioration of the composite material may be initiated.

The prior art includes many examples of honeycomb composite materials, of which the following patents are representative.

European Patent No. 0 722 825 (hereinafter "the '825 Patent") describes a resin transfer molding in combination with a honeycomb core. In particular, the '825 Patent describes a product 10 that is constructed with a central honeycomb core material 12. (The '825 Patent at col. 8, lines 47-50.) The product 10 includes layers of adhesive film 14a, 14b that are sandwiched between layers of a cured prepreg material 16a, 16b. (The '825 Patent at col. 8, lines 50-54.) Cured layers 18a, 18b with preform fibers that have been impregnated with a resin transfer mold ("RTM") resin system lie outside of the prepreg layers 16a, 16b. (The '825 Patent at col. 8, lines 54-58.)

International Patent Application Publication No. WO 95/29807 (hereinafter "the '807 Application") describes a prescored foam for panel fabrication. The '807 Application describes a planar composite panel with a honeycomb core element 32 and edge border 34 covered on both sides with resin-impregnated fiber sheets 38. (The '807 Application at page 5, lines 9-14.)

U.S. Pat. No. 5,685,940 (hereinafter "the '940 Patent") describes adhering tiedown plies in a composite construction. In particular, in connection with the prior art, the '940 Patent describes a Hartz-type composite honeycomb sandwich panel 100 that includes outer face sheets 102 secured to a central honeycomb core 106. (The '940 Patent at col. 4, lines 29-37.) The '940 Patent also describes that an unsupported film adhesive 108, a barrier film 110, and a scrim-supported film adhesive 112 (applied in that order) may be employed to prevent the ingress of material, such as resin, into the honeycomb core 106. (The '940 Patent at col. 4, lines 48-56.) In particular, without a barrier film 110, resin 118 can fill the cells 114 of the honeycomb core 106, as illustrated in FIG. 3. (The '940 Patent at col. 4, lines 53-57.)

U.S. Pat. No. 6,679,969 (hereinafter "the '969 Patent") describes a method of manufacturing a sandwich panel with an open cell core 10 bounded on either side by a film 12 of intumescent material, a dry barrier fabric 14, and an overlay 16 of dry fibers. (The '969 Patent at col. 5, lines 12-18.) The intumescent film 12 expands, as foam, during the curing process to partially fill the cells 10a in the open cell core 10. (The '969 Patent at col. 5, lines 37-43.)

Aside from the use of barrier layers, the prior art does not appear to offer alternative solutions to the difficulties noted above with respect to water ingress.

It is noted that barrier layers present a further difficulty with respect to the prior art. During curing, the barrier layer may entrap water, air, and volatiles in the adhesive layer between the barrier layer and the honeycomb layer. This may weaken the bond established by the adhesive layer, which is to be avoided. In addition, most barrier layers are made from thermoplastic materials, which fail to bond adequately to adhesives and adjacent layers and/or structures. As a result, barrier layers present additional engineering challenges with respect to the construction of composite materials incorporating such barrier layers.

It is in the context of this confluence of factors that the present invention was developed.

SUMMARY OF THE INVENTION

The present invention addresses one or more of the deficiencies noted with respect to the prior art.

In one contemplated embodiment, the present invention provides a composite material that includes a honeycomb layer with top and bottom sides. The honeycomb layer includes a plurality of walls defining a plurality of cells therein. The material also includes a first adhesive layer disposed adjacent to the top side of the honeycomb layer, a second adhesive layer disposed adjacent to the bottom side of the honeycomb layer, a third adhesive layer disposed adjacent to the first adhesive layer on the top side of the honeycomb layer, a first composite layer disposed adjacent to the third adhesive layer on the top side of the honeycomb layer, and a second composite layer disposed adjacent to the second adhesive layer on the bottom side of the honeycomb layer. At least the third adhesive layer possesses viscous properties that discourage the creation of channels within the first composite layer when co-cured.

In another contemplated embodiment, the composite material also includes a fourth adhesive layer positioned between the second adhesive layer and the second composite layer on the bottom side of the honeycomb layer. The fourth adhesive layer possesses viscous properties that discourage the creation of channels within the second composite layer when co-cured.

It is contemplated that the first adhesive layer may be in contact with the top side of the honeycomb layer.

It is also contemplated that the second adhesive layer may be in contact with the bottom side of the honeycomb layer.

In addition, once cured, the third adhesive layer is contemplated to form a chemical bond with the first adhesive layer.

Similarly, once cured, the fourth adhesive layer is contemplated to form a chemical bond with the second adhesive layer.

In one contemplated embodiment, the first composite layer may be in contact with the third adhesive layer.

In a further contemplated embodiment, the second composite layer may be in contact with the fourth adhesive layer.

The wall of the honeycomb layer may be made from aramid fibers suspended in a resin matrix.

The first composite material and the second composite material also may be made from carbon fibers suspended in a resin matrix.

Where carbon fibers are employed, the carbon fibers may be woven into multiple layers of carbon fiber fabric stacked onto one another.

It is contemplated that the third and fourth adhesive layers may include 2-butanone, tetrabromobisphenol A, epoxy resins, dicyandiamide, and diaminodiphenylsulfone.

It is also contemplated that the third and fourth adhesive layers are film adhesives.

The third and fourth adhesive layers may have a cure temperature of about 225-350° F. (105-175° C.).

The third and fourth adhesive layers may have a weight of between about 0.030-0.080 psf (145-390 gsm) and a thickness of between about 0.005-0.013 inches (0.13-0.33 mm).

Alternatively, the third and fourth adhesive layers may have a weight between about 0.03 -0.05 psf (145 -245 gsm). If so, the third and fourth adhesive layers may have a lap shear strength of between about 5770 -6000 psi (39.8 -41.4 MPa) at 75° F. (24° C.).

In one contemplated embodiment, the third and fourth adhesive layers are compositionally identical.

In another contemplated embodiment, the first and second adhesive layers are compositionally identical.

It is contemplated that the first adhesive layer gels at a first time period and the third adhesive layer gels at a second time period. The first time period and the second time period are contemplated to be within a range of at least one of ±15%, ±10%, ±7%, ±6%, ±5%, ±4%, ±3%, ±2%, or ±1% of one another.

It is contemplated that the first adhesive layer has a first minimum viscosity during a curing cycle, the third adhesive layer has a second minimum viscosity during the curing cycle, and the second minimum viscosity is at least twice as large as the first minimum viscosity.

The third and fourth adhesive layers may have a minimum viscosity during a cure cycle of about 2200 P when heated at a rate of 1° F./min. (0.56° C./min.).

Alternatively, the third and fourth adhesive layers may have a minimum viscosity during a cure cycle of about 1500 P when heated at a rate of 3° F./min. (or 1.68° C./min.).

Still further, the third and fourth adhesive layers may have a minimum viscosity during a cure cycle of about 1420 P when heated at a rate of 5° F./min. (or 2.80° C./min.).

It is contemplated that the third and fourth adhesive layers have a gel time of about 167 min. (±10%).

Alternatively, the third and fourth adhesive layers may have a gel time of about 127 min. (±10%).

Still further, the third and fourth adhesive layers may have a gel time of about 119 min. (±10%).

The present invention also provides a method of manufacturing a composite material that includes providing a honeycomb layer with top and bottom sides, the honeycomb layer having a plurality of walls defining a plurality of cells therein, providing a first adhesive layer adjacent to the top side of the honeycomb layer, providing a second adhesive layer adjacent to the bottom side of the honeycomb layer, providing a third adhesive layer adjacent to the first adhesive layer on the top side of the honeycomb layer, providing a first composite layer adjacent to the third adhesive layer on the top side of the honeycomb layer, providing a second composite layer adjacent to the second adhesive layer on the bottom side of the honeycomb layer, and co-curing the honeycomb layer, the first adhesive layer, the second adhesive layer, the third adhesive layer, the first composite layer, and the second composite layer. At least the third adhesive layer exhibits viscous properties that discourage creation of channels within the first composite layer during co-curing.

Alternatively, the present invention provides a method of manufacturing a composite material that includes providing a sandwich arrangement of a honeycomb layer with top and bottom sides, a first adhesive layer disposed adjacent to the top side of the honeycomb layer, a second adhesive layer disposed adjacent to the bottom side of the honeycomb layer, a third adhesive layer disposed adjacent to the first adhesive layer on the top side of the honeycomb layer, a first composite layer disposed adjacent to the third adhesive layer on the top side of the honeycomb layer, and a second composite layer disposed following the second adhesive layer on the bottom side of the honeycomb layer. The method involves curing the sandwich arrangement at a heat rate of between 1° F./min and 5° F./min in order to arrive at the composite material. During the curing, the first adhesive layer and the third adhesive layer have gel times that are within 10% of each other and a minimum viscosity of the first adhesive layer is at least half of the minimum viscosity of the third adhesive layer.

Further aspects of the present invention will be made apparent form the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of a jet aircraft where one or more jet engines (also referred to as turbine engines or turbofan engines) are affixed (or attached) to the fuselage of the aircraft. While the invention is discussed in this context, the present invention is not intended to be limited solely to the construction of aircraft with jet engines. It is contemplated that the present invention may be employed in connection with other type of aircraft, as should be apparent to those skilled in the art. In addition, the present invention may be used in the construction of other types of vehicles including, but not limited to, automobiles, boats, train cars, etc.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or nose) of the aircraft. The term "rear" (or its equivalent) refers to the aft end (back end or tail) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
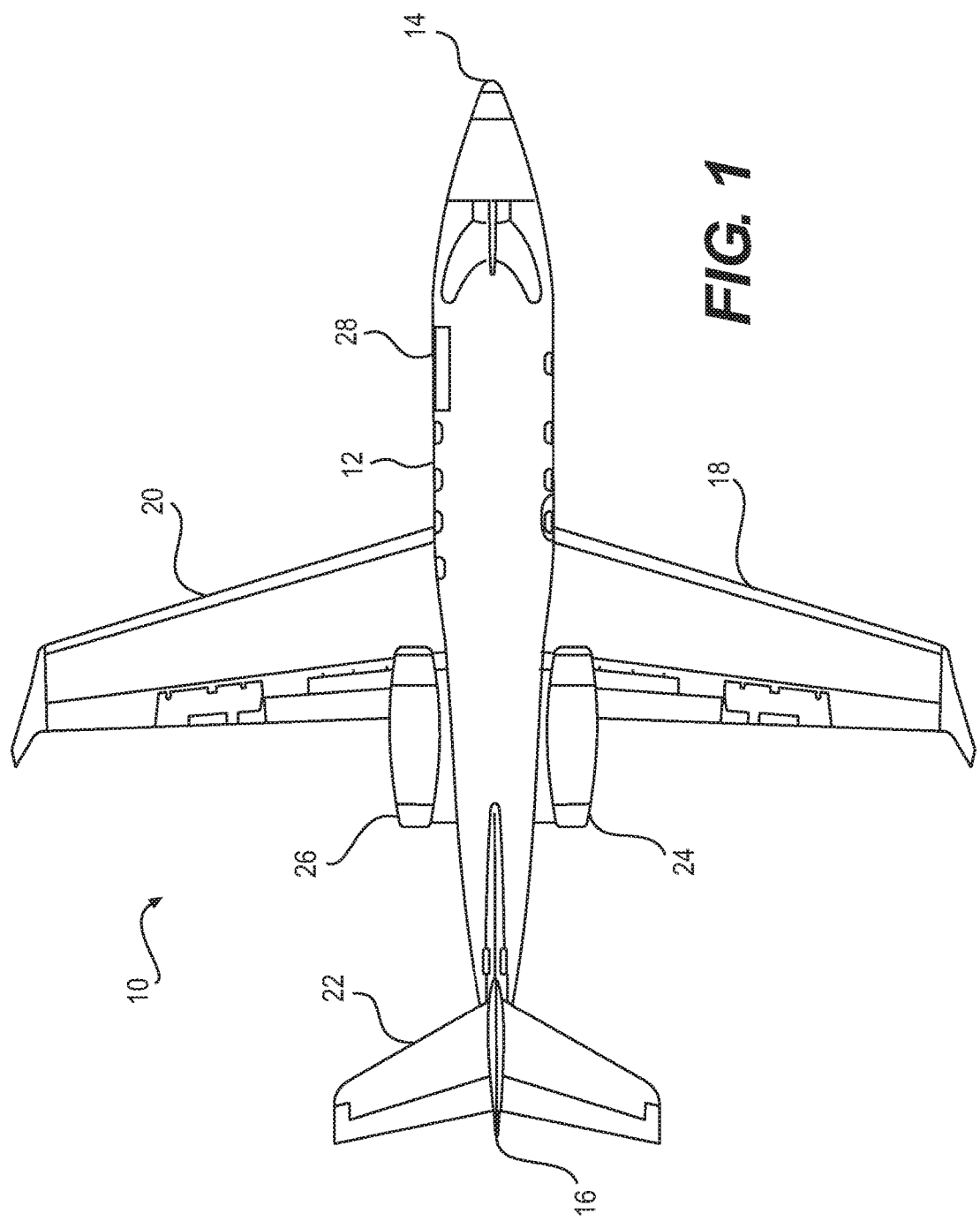
FIG. 1 is a graphical, top view of an example of a style of aircraft that may be provisioned with one or more panels of the honeycomb composite material of the present invention.

FIG. 1 is a perspective illustration of an aircraft 10 of the type on which the honeycomb composite material of the present invention might be employed. The aircraft 10 includes a fuselage 12 having a front (or nose) end 14 and a rear (or tail) end 16. Right and left wings 18, 20 are attached to the fuselage 12. In addition, the fuselage 12 includes a tail section (or empennage) 22 at the rear end 16.

The aircraft 10 also includes right and left engines 24, 26 that are connected to the fuselage 12 rearward of the wings 18, 20. A door 28 permits ingress and egress with respect to the interior cabin of the aircraft 10.

As may be apparent to those skilled in the art, the aircraft 10 illustrated in FIG. 1 is more commonly referred to as a personal or private jet. Private jets may be used for personal and/or corporate travel. Private jets typically are distinguishable from commercial jets in that private jets typically are smaller and include a more modest seating density than commercial aircraft.

While the present invention may be employed on private aircraft, the present invention is not intended to be limited to private aircraft. To the contrary, the present invention is contemplated to be applicable to any size and type of aircraft, including commercial, passenger aircraft. In addition, it is contemplated that the present invention may be applicable for the construction of equipment other than aircraft. Such vehicles include, but are not limited to, railway cars, automobiles, boats, recreational vehicles, and the like.

Before discussing the particulars of the present invention, a brief overview of selected difficulties that may arise, as indicated above, with respect to honeycomb composite materials is discussed in connection with FIGS. 2-6. This discussion is presented with respect to one construction for a honeycomb material known in the prior art. At least for this reason, FIGS. 2-6 are labeled "PRIOR ART."

Figure 2:
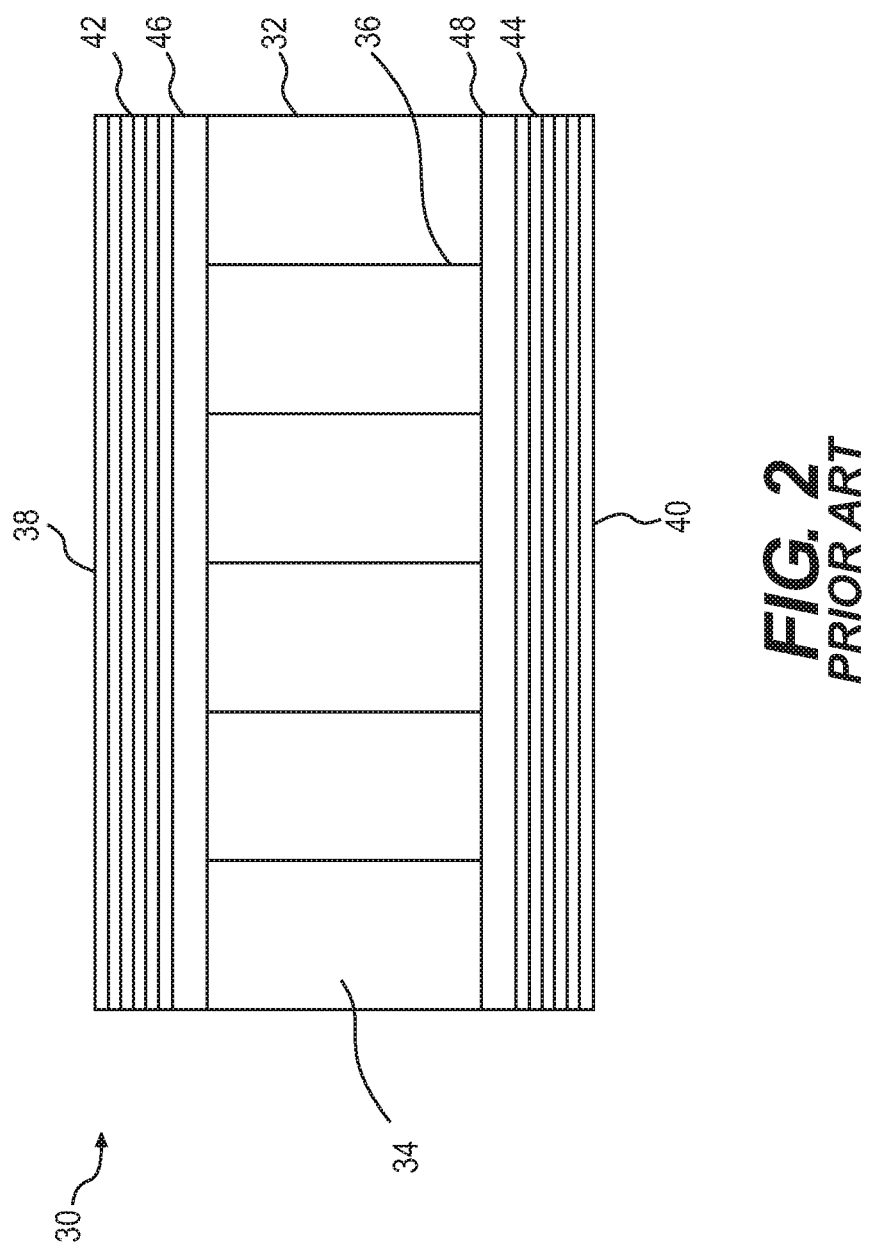
FIG. 2 is a graphical, side view of a portion of a honeycomb composite material known in the prior art.

FIG. 2 illustrates one prior art example of a honeycomb core sandwich construction material 30 that is known in the prior art. The honeycomb core sandwich construction material 30 includes a honeycomb layer 32 that, most commonly, comprises a plurality of hexagonally-shaped cells 34 that are divided by walls 36. The honeycomb layer 32 is bounded on the top and bottom sides 38, 40 by top and bottom layers of fabric, formed by top and bottom multi-layer carbon fiber laminates 42, 44 impregnated with a suitable resin. Top and bottom adhesive layers 46, 48 are deposited between the honeycomb layer 32 and the carbon fiber laminate layers 42, 44. The adhesive layers 46, 48 affix the honeycomb layer 32 to the carbon fiber laminate layers 42, 44.

Figure 3:
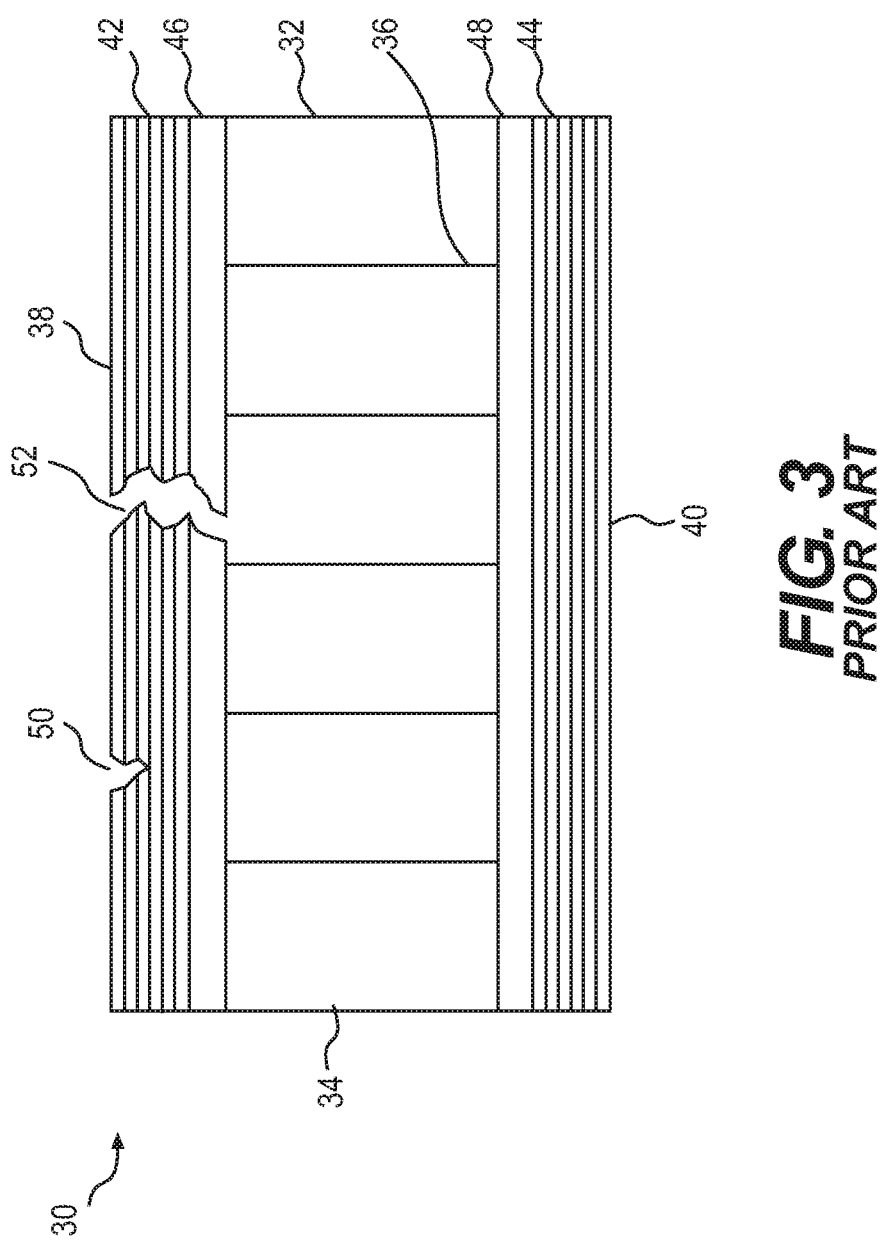
FIG. 3 is a graphical, side view of the honeycomb composite material illustrated in FIG. 2, showing the development of a surface crack and a chimney crack.

FIG. 3 is an illustration of the honeycomb core sandwich construction material 30 that is illustrated in FIG. 2. In this illustration, a crack 50 (also referred to as a surface crack 50) is shown. The surface crack 50 is intended to illustrate a defect in the top carbon fiber laminate layer 42 that extends partially through the top carbon fiber laminate layer 42. A second crack 52 is illustrated in FIG. 3. This second crack 52 extends all of the way through the top carbon fiber laminate layer 42. For this reason, the second crack 52 is referred to as a chimney 52 or chimney crack 52. A chimney crack 52 establishes a pathway from one of the cells 34 in the honeycomb layer 32 to the exterior of the honeycomb core sandwich construction material 30.

With respect to FIG. 3, it is contemplated that cracks 50, 52 also may form from the honeycomb layer 32 and extend toward the top and/or bottom sides 38, 40 of the honeycomb core sandwich construction material 30. In other words, the cracks 50, 52 need not be initiated at the exterior of the honeycomb core sandwich construction material 30. Instead, the cracks 50, 52 may be initiated from the interior, primarily at or near the honeycomb layer 32. Moreover, partial cracks 50 may initiate from both the interior and the exterior of the honeycomb core sandwich construction material 30 and meet somewhere in the middle to establish a chimney crack 52.

With respect to the term "chimney crack 52," it is noted that the chimney crack 52 may be called by other appellations. For example, as noted above, the term "chimney crack" is intended to encompass, but is not limited to, micro-cracks, fractures, micro-fractures, pores, micro-pores, porous air passages, voids, micro-voids, pathways, micro-pathways, passages, micro-passages, weakened zones, etc. Regardless of the manner of formation of the chimney cracks 52 or the name applied thereto, the present invention is intended to address the formation of such chimney cracks 52 in the honeycomb core sandwich construction material 30.

The surface crack 50 is presented as a minor defect in the top carbon fiber laminate layer 42. Surface cracks 50 may be created as a result of an impact on the honeycomb core sandwich construction material 30. Alternatively, surface cracks 50 may be initiated due to any other of a number of factors including, but not limited to, cyclic fatigue. In and of itself, a surface crack 50 is not considered to be particularly problematic, because the crack 50 does not extend through the honeycomb core sandwich construction material 30 into one of the cells 34 that make up the honeycomb layer 32. While a surface crack 50, over time, may present a more serious issue, it is equally possible that a surface crack 50 may be benign, meaning that the crack 50 remains static or unchanged throughout the lifetime of the honeycomb core sandwich construction material 30.

Figure 4:
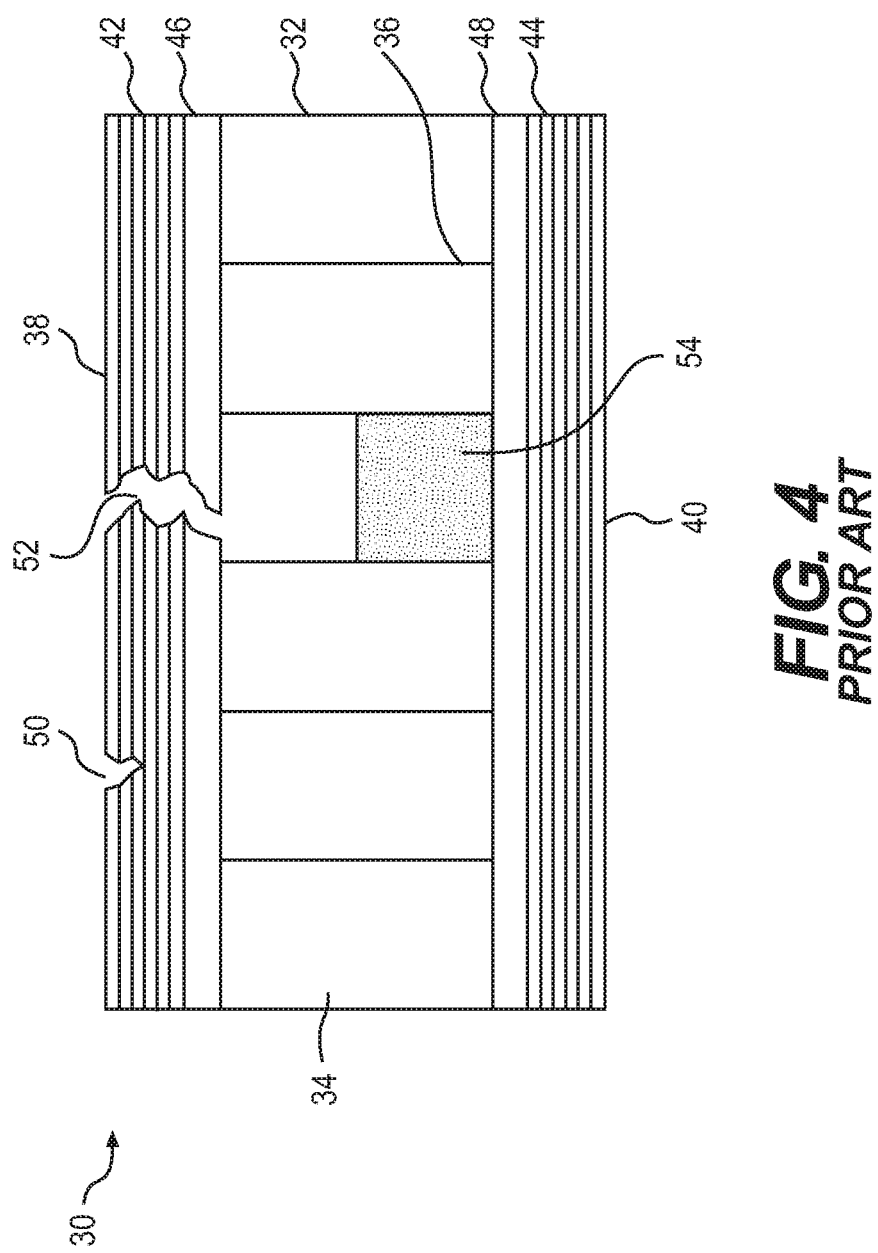
FIG. 4 is a graphical, side view of the honeycomb composite material illustrated in FIG. 3, showing the presence of water in one of the cells of the honeycomb layer as a result of the establishment of the chimney crack shown in FIG. 3.

As noted, it is possible that the crack 50 may propagate (or combine with other cracks 50) until it becomes the second type of crack, specifically a chimney crack 52. The chimney crack 52 is problematic, because it has the potential for establishing a pathway for water ingress into one of the cells 34 in the honeycomb layer 32. As shown in FIG. 4, when water 54 enters the honeycomb layer 32, there is the potential for degradation of the honeycomb core sandwich construction material 30.

Alternatively, the chimney crack 52 may develop from the interior of the honeycomb core sandwich construction material 30. Specifically, as noted above, it is possible that water, air, or volatiles in the honeycomb layer 32 may try to escape from the honeycomb layer 32 during the curing process, which occurs at elevated temperatures. If the water, air, and/or volatiles establish a pathway from the honeycomb layer 32 to the exterior of the honeycomb core sandwich construction material 30, this alternative methodology may establish a chimney crack 52 in the honeycomb core sandwich construction material 30. As noted above, the chimney crack 52 may propagate from the exterior to the interior of the honeycomb core sandwich construction material 30.

Regardless of the mechanism that establishes the chimney crack 52, the formation of chimney cracks 52 is to be avoided.

FIG. 4 illustrates water 54 after it has entered one of the cells 34 through the chimney crack 52. In this illustration, the exterior of the honeycomb core sandwich construction material 30 that is exposed to the environment is considered to be the top 38 of the material. If water 54 enters the cell 34 through the chimney crack 52, the water 54 may accumulate in the cell 34. As should be apparent, the orientation of the cells 34 is not critical, as water 54 may accumulate in one or more of the cells 34 regardless of the orientation of the honeycomb core sandwich construction material 30.

As should be apparent to those skilled in the art, when water 54 freezes, its solid state occupies a larger volume than its liquid state. In other words, frozen water 54 is less dense than liquid water 54. When water 54 freezes, therefore, it expands. If water 54 accumulates in one of the cells 34 and freezes, the water 54 expands, thereby exerting increased pressure on the walls 36 of the honeycomb layer 32. If the pressure exerted by the freezing (or frozen) water 54 exceeds the ability of the wall 36 to withstand the pressure, the wall 36 will break under the pressure. Repeated freezing and thawing of the water 54 exacerbates this problem. Given that the aircraft 10, during flight, experiences temperatures both above and below freezing, cyclic vaporization, sublimation, condensation, and/or freezing of water 54 is expected to occur.

Figure 5:
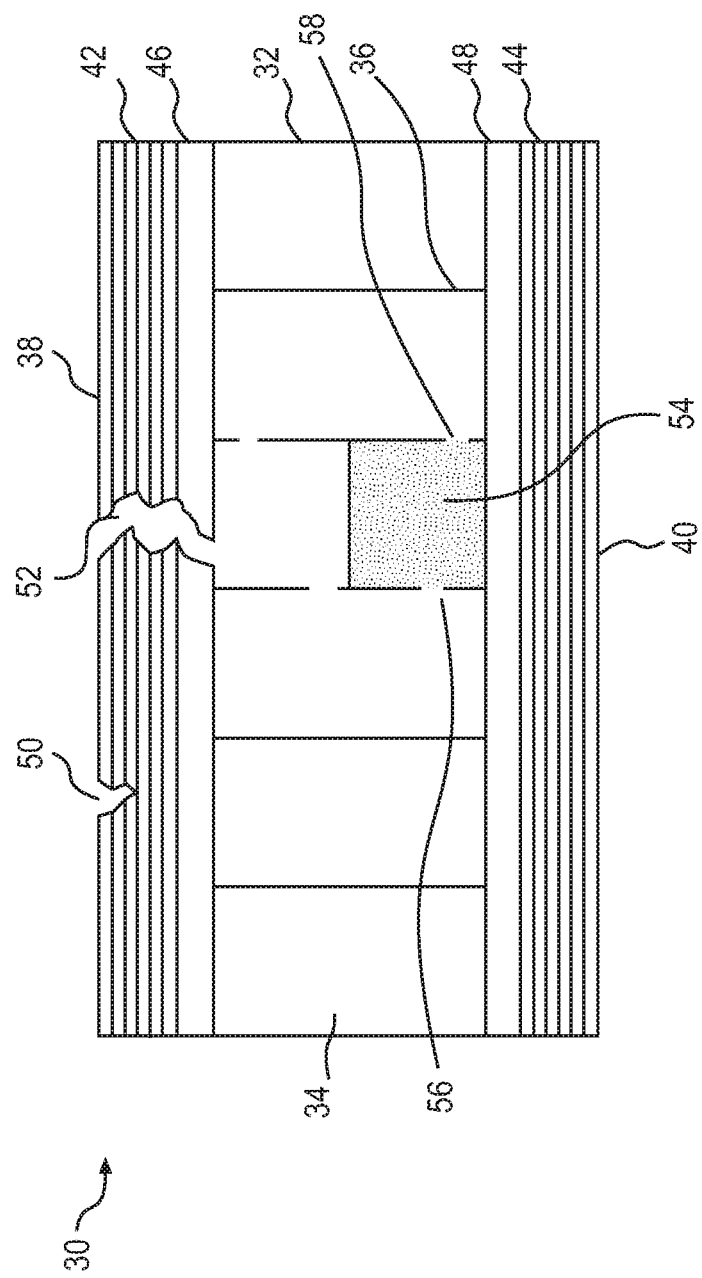
FIG. 5 is a graphical, side view of the honeycomb composite material illustrated in FIG. 4, showing the development of defects in the wall structure of the honeycomb cells after repeated cycles of freezing and thawing of the water in one of those cells.

FIG. 5 illustrates holes 56, 58 in the walls 36 of the cells 34, which holes 56, 58 represent a breakdown of the honeycomb layer 32 due to repeated freezing and thawing of the water that ingresses into the honeycomb layer 32 via the chimney crack 52. The fracture holes 56, 58 represent a breakdown of the walls 36 forming the cells 34 of the honeycomb layer 32.

Figure 6:
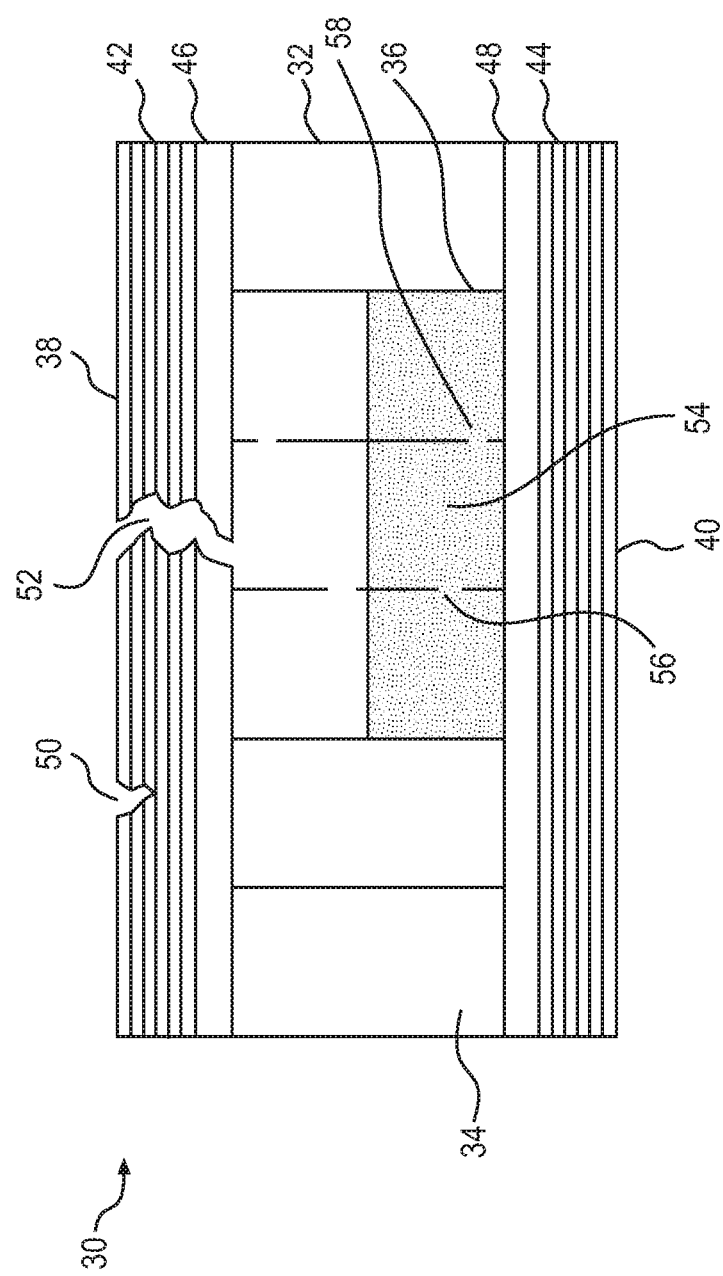
FIG. 6 is a graphical, side view of the honeycomb composite material illustrated in FIG. 5, showing the creep of water from an initial cell to adjacent cells in the honeycomb layer as a result of the development of defects in the walls of the cell structure in the honeycomb layer(s)

If the honeycomb core sandwich construction material 30 remains in service and the chimney crack 52 is not detected, it is possible that more water 54 may enter through the chimney crack 52 into the cells 34. The fracture holes 56, 58 then permit the water 54 to migrate to adjacent cells 34, as illustrated in FIG. 6.

As should be apparent to those skilled in the art, if one or more of the cells 34 should become filled with water 54, for example, the water 54 may apply pressure to the adjacent layers to cause damage to the adjacent layers. This damage includes, but is not limited to a delamination of the skin (i.e., the carbon fiber laminate layers 42, 44) from the honeycomb core 32.

Figure 7:
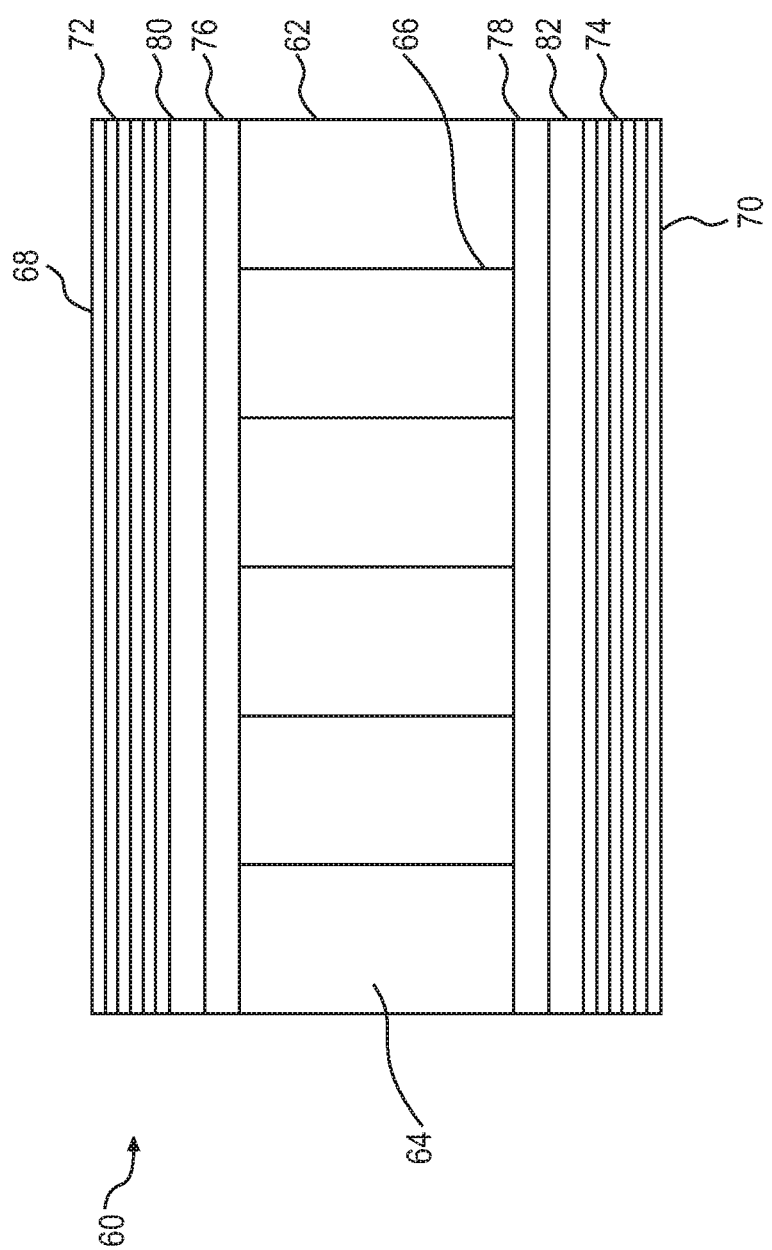
FIG. 7 is a graphical, side view of a honeycomb composite material according to an embodiment of the present invention.

FIG. 7 illustrates a honeycomb core sandwich construction material 60 according to the present invention.

The honeycomb core sandwich construction material 60 includes a honeycomb layer 62 that is made up of a plurality of cells 64. The cells 64 are divided by walls 66. It is contemplated that the cells will be hexagonally-shaped, as the name suggests. As should be apparent to those skilled in the art, however, the shapes of the cells may depart from hexagonal shapes without departing from the scope of the present invention. For example, the cells 64 may be rectangularly shaped, square shaped, etc.

The walls 66 of the honeycomb layer 62 are contemplated to be made from aramid fibers suspended in a resin. The aramid fibers may be woven or non-woven. One example of a suitable aramid fiber is sold under the name "KEVLAR®," which is a registered trademark of the E.I. DuPont de Nemours Company having an address at 1007 Market Street, Wilmington, Del. 19898. In the alternative, any suitable aramid fiber may be employed to construct the honeycomb layer 62 without departing from the scope of the present invention. Still further, it is contemplated that the walls 66 of the honeycomb layer 62 may be formed from a suitable carbon fiber material embedded in a resin material. Still other materials may be employed without departing from the scope of the present invention, such as para aramids, glass, etc.

The honeycomb core sandwich construction material 60 is contemplated to be bounded on its top side 68 by a top carbon fiber laminate layer 72. The honeycomb core sandwich construction material 60 is contemplated to be bounded on its bottom side 70 by a bottom carbon fiber laminate layer 74.

The top and bottom carbon fiber composite layers 72, 74 are contemplated to be constructed from a plurality of woven carbon fiber fabrics that are suspended in a resin matrix. Each of the different carbon fiber fabric layers that make up the carbon fiber composite layers 72, 74 are contemplated to be oriented in different directions to maximize the strength of the individual carbon fiber composite layers 72, 74. As should be apparent to those skilled in the art, however, the exact orientation of individual carbon fiber fabric layers is contemplated to be dictated by the location of use of the honeycomb core sandwich construction material 60. While it is contemplated that the carbon fiber fabric layers are woven fabric layers, it is also contemplated that some or all of the carbon fiber fabric layers may be made from non-woven fibers.

As also should be apparent to those skilled in the art, the top and bottom carbon fiber composite layers 72, 74 need not be made entirely from carbon fiber fabric suspended in a resin matrix. It is contemplated that one or more of the layers may include an aramid fiber component. In addition, it is contemplated that one or more other types of materials may be included in the carbon fiber composite layers 72, 74. For example, one or more polyamide materials or threads may be employed. Polyamides include, but are not limited to, materials such as nylon.

Between the carbon fiber laminate layers 72, 74 and the honeycomb layer 62, a top adhesive layer 76 and a bottom adhesive layer 78 are provided. The adhesive layers 76, 78 may be the same material as the adhesive layers 46, 48 described above. Alternatively, the adhesive layers 76, 78 may be made from a different type of adhesive.

A top interleaf adhesive layer 80 is sandwiched between the top adhesive layer 76 and the carbon fiber laminate layer 72. Similarly, a bottom interleaf adhesive layer 82 is sandwiched between the bottom adhesive layer 78 and the carbon fiber laminate layer 74. As should be apparent, the interleaf adhesive layers 80, 82 represent at least one departure from the prior art.

Before discussing the interleaf adhesive layers 80, 82 in greater detail, it is noted that the different layers making up the honeycomb core sandwich construction material 60 illustrated in FIG. 7 are illustrated as being symmetrically disposed on either side of the honeycomb layer 62. While this is the preferred arrangement, the layers need not be symmetrically constructed or disposed to practice the present invention. For example, the top carbon fiber laminate layer 72 may be thicker than the bottom carbon fiber laminate layer 74. In addition, the top adhesive layer 76 may be a different adhesive than the adhesive employed for the bottom adhesive layer 78. As should be apparent, there are numerous variations that are possible for the different layers. Variations that may be contemplated by those skilled in the art are intended to be encompassed by the present invention.

In addition, while the present invention is described in terms of an axially symmetrical honeycomb core sandwich construction material 60, the present invention also is contemplated to encompass axially asymmetrical variants. For example, it is contemplated in one embodiment, that the bottom interleaf adhesive layer 82 may be omitted, leaving only the top interleaf adhesive layer 80. In another contemplated embodiment, the bottom interleaf adhesive layer 82 may be replaced by a different layer or adhesive altogether. As should be apparent, the number of possible variants is considerably large. These variants are contemplated to be encompassed by the present invention.

It is noted that the honeycomb core sandwich construction material 60 of the present invention may be employed for any of a number of different parts of the aircraft 10. The honeycomb core sandwich construction material 60 may be used to construct the engine nacelles. The honeycomb core sandwich construction material 60 may form part of the fuselage 12. The honeycomb core sandwich construction material 60 may form a part (or all) of the wings 18, 20. Still further, the honeycomb core sandwich construction material 60 may be incorporated into one or more of the control surfaces on the aircraft 10. As should be apparent, the honeycomb core sandwich construction material 60 of the present invention is not limited in its application to any one particular area on the aircraft 10.

Returning to FIG. 7, the interleaf adhesive layers 80, 82 are provided between the top and bottom adhesive layers 76, 78 and the top and bottom carbon fiber laminate layers 72, 74. The interleaf adhesive layers 80, 82 are contemplated to be made from an adhesive material that has curing characteristics (including viscosity) such that, when the interleaf adhesive cures, the integrity of the interleaf adhesive layers 80, 82 is maintained during the curing process.

With renewed reference to FIGS. 2-6, during the curing process, when the various layers are subjected to elevated temperatures (by comparison with ambient temperature), the air in the cells 34 expands, applying pressure to the layers adjacent thereto. During the curing phase, it is possible that the water, air, and volatiles trapped in some of the cells 34 may find an escape pathway from the cell 34 to the exterior of the honeycomb core sandwich construction material 30. If so, it is contemplated that the escaping air may establish a crack 50, 52.

The interleaf adhesive layers 80, 82 are sufficiently viscous that they prevent (or at least diminish) water, air, and volatiles from establishing one or more cracks 50, 52 (specifically, chimney cracks 52) in the honeycomb core sandwich construction material 60. In other words, the interleaf adhesive layers 80, 82 have a sufficient resistance to forces (e.g., pressures from water, gases, air, and/or volatiles) to prevent (or at least significantly discourage) the formation of chimney cracks 52 in the honeycomb core sandwich construction material 60.

Properties for the interleaf adhesive layers 80, 82 that are contemplated for the present invention include a sufficient viscosity to prevent (or at least significantly discourage) the evacuation of water (e.g., water vapor), air, and (phenolic resin) volatiles that may be present in the cells 64 when the honeycomb core sandwich construction material 60 is heated during curing. At least for the same reason, the interleaf adhesive layers 80, 82 are contemplated to have a low porosity. The low porosity (e.g., low permeability), taken together with the relatively high viscosity, is contemplated to discourage the creation of chimney cracks 52.

Figure 8:
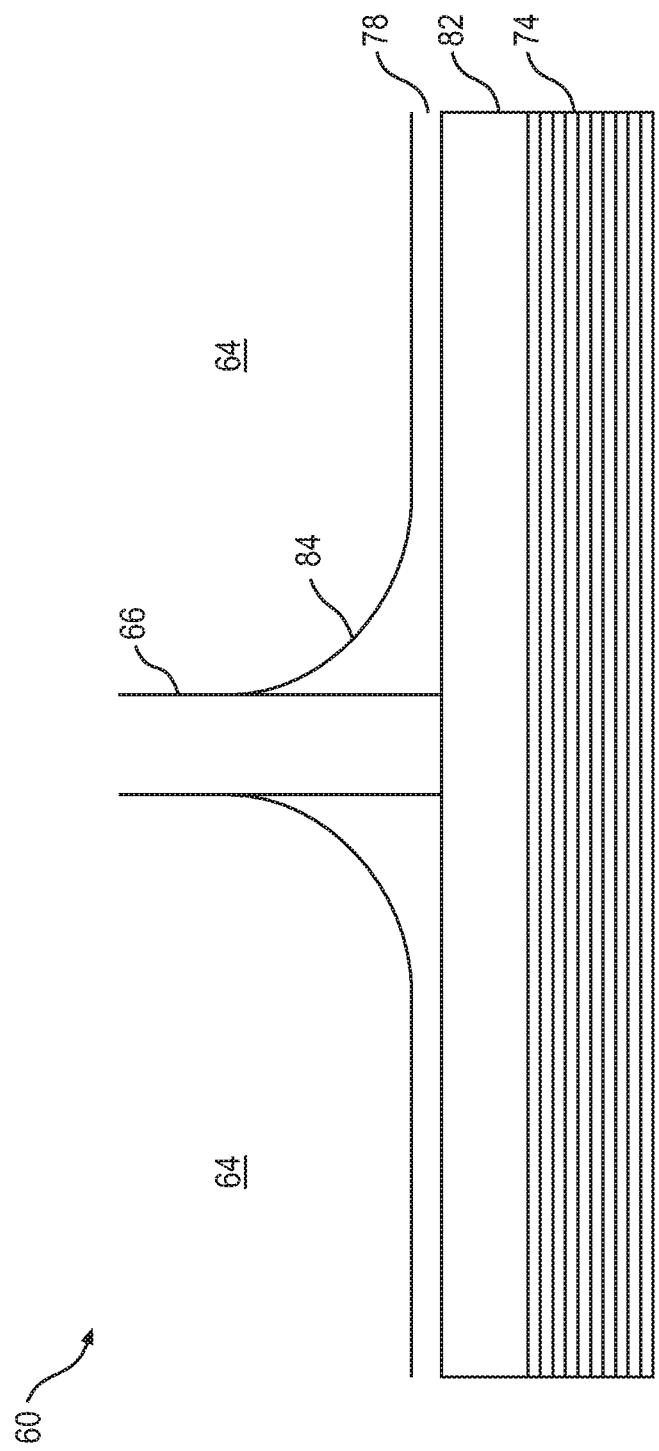
FIG. 8 is an enlarged graphical, side view of a portion of the honeycomb composite material illustrated in FIG. 7, showing the filleting of an adhesive layer to one of the cell walls during the manufacture of the present invention.

FIG. 8 illustrates a further property of the interleaf adhesive layers 80, 82. In FIG. 8, only the bottom half of the honeycomb core sandwich construction material 60 is illustrated. As should be apparent, any discussion of the bottom interleaf adhesive layer 82 applies equally to the top interleaf adhesive layer 80. While the wall 66 is illustrated as terminating at the interleaf adhesive layer 82, this illustration is not intended to convey that the wall 66 must terminate at this location. As should be apparent to those skilled in the art, the wall 66 may terminate at a position intermediate to the top and bottom surface of the interleaf adhesive layer 82 or some other suitable terminus.

As noted above, the interleaf adhesive layer 82 has a relatively high viscosity. As a result, the interleaf adhesive layer 82 remains stably positioned during the curing process. The adhesive selected for the bottom adhesive layer 78, on the other hand, is less viscous. As a result, the adhesive forming the bottom adhesive layer 78 has a tendency to fillet the walls 66 of the cells 64. As illustrated, this means that the adhesive forming the bottom adhesive layer 78 has a tendency to create a hyperbolic shape 84 (i.e., a fillet 84) at the intersection between the wall 66 and the bottom carbon fiber laminate layer 74. The filleting of the walls 66 by the adhesive forming the bottom adhesive layer 78 creates a thinned section of the adhesive (forming the bottom adhesive layer 78) between the walls 66, which may provide a location where air may penetrate through the bottom adhesive layer 78 and the layers adjacent to the bottom adhesive layer 78. The interleaf adhesive 82 resists attempts by gas pressure in the cells 64 from penetrating the layers of the carbon fiber laminate 74, thereby, avoiding (or at least greatly reducing) the creation of one or more chimney cracks 52.

As should be apparent to those skilled in the art, manufacturing processes for composite materials fall into two categories: (1) those that require curing in an autoclave (which involves the application of exterior pressure on the composite material during the curing process) and (2) those that do not require curing in an autoclave (so called "out of autoclave" or OOA materials, which do not require the application of external pressure during curing). The present invention is contemplated to be applicable to composite materials that are manufactured using an autoclave and also to those materials that may be manufactured without an autoclave (otherwise known as OOA materials). In particular, the present invention is contemplated to be applicable preferably to composite materials produced without an autoclave (i.e., an out of autoclave (or OOA) material).

The interleaf adhesive layers 80, 82 are contemplated to be applied as a sheet during the construction of the honeycomb core sandwich construction material 60. As such, each of the interleaf adhesive layers 80, 82 is contemplated to be unrolled, as a layer, onto the substrate material. The interleaf adhesive layers 80, 82 may be tacky or non-tacky.

The present invention contemplates that the adhesive layers 76, 78 may be FM® 300-2 Film Adhesive layers manufactured by Cytec Engineered Materials, Inc., with a corporate address at 5 Garrett Mountain Plaza, Woodland Park, N.J. 07424. ("FM" is a registered trademark of Cytec, Inc.)

With reference to the technical data sheet for FM® 300-2 Film Adhesive, the following properties for the adhesive layers 76, 78 are provided. (See the FM® 300-2 Film Adhesive Technical Data Sheet from Cytec Engineered Materials, Rev. 2, dated September 27, 2011 (AEAD-00004), the contents of which are incorporated herein by reference.)

The FM® 300-2 film adhesive is a 250° F. (120° C.) cure version of the FM® 300 film adhesive also offered by Cytec Engineered Materials. The FM® 300-2 delivers the same high temperature performance, toughness, and stress/strain properties of the FM® 300 film adhesive without requiring a 350° F. (175° C.) cure cycle. The FM® 300-2 film adhesive was developed for co-curing and secondary composite bonding applications. The required cure temperature is reduced, allowing for secondary bonding of the structure far below the composite's glass transition point. The FM® 300-2 film adhesive also offers optimum flow control desirable for co-cure composite bonding. The FM® 300-2 film adhesive may be utilized at service temperatures of from 67° F. to 300° F. (−55° C. to 149° C.) and has excellent moisture and corrosion resistance in high humidity environments with no significant reduction in mechanical properties.

Again, with continued reference to the technical data sheet, the adhesive layers 76, 78 are contemplated to have a nominal weight of 0.030-0.100 psf (pounds per square foot) (147-489 gsm (grams per square meter)) and a nominal thickness of 0.005-0.016 inches (0.13-0.41 mm). At ambient temperature (75° F., 24° C.), the adhesive layers 76, 78 are contemplated to have a lap shear strength of 4850-5900 psf (33.5-40.7 gsm), a metal-to metal drum peel of 30-35 in-lb/in (130-160 Nm/m), a honeycomb sandwich peel of 17-52 in-lb/3 in (25-77 Nm/m), and a flatwise tensile strength of 592-1240 psi (4.08-8.56 MPa).

It is also contemplated that the adhesive layers 76, 78 (FM® 300-2 Film Adhesive) are made from 2-butanone, also referred to as methyl ethyl ketone ("MEK"). In addition, it is contemplated that the adhesive layers 76, 78, combine the following constituents: (1) 2-butanone, (2) tetrabromobisphenol A, (3) epoxy resins, (4) dicyandiamide, and (5) diaminodiphenylsulfone, with the primary constituent being epoxy resins. These constituent ingredients are not intended to be limiting of the present invention. (Chada, S., et al., *Combined FTIR/IFM Analysis of Bonded Joints*, Chemistry and Chemical Engineering Department, South Dakota School of Mines and Technology, at page 1 (undated report), the entire contents of which are incorporated herein by reference.) (See also, Kohli, Dalip K., *Improved 121° C. Curing Epoxy Film Adhesive for Composite Bonding and Repair Applications: FM® 300-2 Adhesive System*, International Journal of Adhesion & Adhesives 19, pp. 231-242 (1999), the entire contents of which are incorporated herein by reference.)

With continued reference to the technical data sheet for the FM® 300-2 Film Adhesive offered for sale by Cytec Engineered Materials, the following additional information about the adhesive layers 76, 78 are provided.

Table 1, provided below, provides an overview of the nominal weight and thickness of selected embodiments for the adhesive layers 76, 78.

TABLE 1

| Product Number | Nominal Weight, psf (gsm) | Nominal Thickness, inches (mm) |
|---|---|---|
| FM 300-2K film adhesive | 0.100 (489) | 0.016 (0.41) |
| FM 300-2K film adhesive | 0.080 (391) | 0.013 (0.33) |
| FM 300-2M film adhesive | 0.050 (244) | 0.008 (0.20) |
| FM 300-2M film adhesive | 0.060 (293) | 0.010 (0.25) |
| FM 300-2M film adhesive | 0.030 (147) | 0.005 (0.13) |
| FM 300-2U film adhesive | 0.030 (147) | 0.005 (0.13) |

Table 2, provided below, summarizes the mechanical properties of selected embodiments for the adhesive layers 76, 78.

TABLE 2

| Property and Test Condition | FM 300-2K 0.10 psf (489 gsm) | FM 300-2K 0.08 psf (391 gsm) | FM 300-2M 0.05 psf (244 gsm) | FM 300-2M 0.03 psf (147 gsm) |
|---|---|---|---|---|
| Lap Shear Strength, psi (MPa) ASTM 1002 | | | | |
| −67° F. (−55° C.) | 4280 (29.5) | 4580 (31.6) | 4330 (29.8) | 4000 (27.6) |
| 75° F. (24° C.) | 5410 (37.3) | 5900 (40.7) | 4850 (33.5) | — |
| 180° F. (82° C.) | 5200 (35.9) | 5300 (36.6) | 5150 (35.5) | — |
| 250° F. (121° C.) | 3750 (25.9) | 3730 (25.7) | 3800 (26.2) | 4040 (27.9) |
| 300° F. (149° C.) | — | 2300 (15.8) | — | 2955 (20.4) |
| Metal-to-Metal Climbing Drum Peel, in-lb/in (Nm/m) | | | | |
| −67° F. (−55° C.) | 17 (76) | 18 (80) | 20 (90) | 23 (100) |
| 75° F. (24° C.) | 33 (150) | 35 (160) | 31 (140) | 30 (130) |
| 180° F. (82° C.) | 39 (170) | 40 (180) | 35 (160) | 33 (150) |
| 250° F. (121° C.) | 39 (170) | 38 (170) | 35 (160) | 31 (140) |
| 300° F. (149° C.) | — | 40 (180) | — | 33 (150) |
| Honeycomb sandwich peel, in-lb/3 in (Nm/m) | | | | |
| −67° F. (−55° C.) | 36 (53) | 34 (50) | 15 (22) | 14 (21) |
| 75° F. (24° C.) | 50 (74) | 45 (67) | 21 (31) | 17 (25) |
| 250° F. (121° C.) | 50 (74) | 44 (65) | 22 (33) | 16 (24) |
| 300° F. (149° C.) | — | 33 (48) | — | 13 (19) |
| Flatwise tensile, psi (MPa) | | | | |
| −67° F. (−55° C.) | 1230 (8.49) | 1080 (7.45) | 950 (6.56) | 612 (4.22) |
| 75° F. (24° C.) | 1240 (8.56) | 1120 (7.73) | 892 (6.15) | 592 (4.08) |
| 180° F. (82° C.) | 1000 (6.90) | 961 (6.63) | 760 (5.24) | 496 (3.42) |
| 250° F. (121° C.) | 700 (4.83) | 685 (4.73) | 534 (3.68) | 460 (3.17) |
| 300° F. (149° C.) | — | 325 (2.24) | — | 160 (1.10) |

Table 3, provided below, summarizes specific information concerning the effect of the cure cycle on selected, physical properties of selected embodiments of the adhesive layers 76, 78.

TABLE 3

| Property and Test Condition | Cure Cycle 90 minutes 250° F. (121° C.) | Cure Cycle 60 minutes 300° F. (149° C.) | Cure Cycle 60 minutes 350° F. (177° C.) |
|---|---|---|---|
| Lap Shear Strength, psi (MPa) | | | |
| 75° F. (24° C.) | 6100 (42.0) | 6460 (44.5) | 6280 (43.2) |
| 225° F. (107° C.) | 4660 (32.1) | 4680 (32.2) | 4560 (31.4) |
| Floating roller peel, lbs/in (kN/m) | | | |
| 75° F. (24° C.) | 30 (5.3) | 34 (6.0) | 34 (6.0) |
| 225° F. (107° C.) | 43 (7.6) | 45 (7.9) | 49 (8.6) |

TABLE 3-continued

| Property and Test Condition | Cure Cycle 90 minutes 250° F. (121° C.) | Cure Cycle 60 minutes 300° F. (149° C.) | Cure Cycle 60 minutes 350° F. (177° C.) |
|---|---|---|---|
| Honeycomb sandwich peel, in-lb/3 in. (Nm/m) | | | |
| 75° F. (24° C.) | 48 (71) | 52 (77) | 50 (74) |
| 225° F. (107° C.) | 50 (74) | 55 (81) | 60 (89) |
| Flow, % | 575 | 525 | 575 |
| Tg, ° C. (TMA) | 143 | 140 | 140 |

Table 4, provided below, conveys selected information concerning the composite bonding of procured thermosetting substrates with the FM® 300-2 Film Adhesive, which is one of the contemplated embodiments for the adhesive layers 76, 78.

TABLE 4

| Precured Composite Substrate | Bonded Specimen Exposure | Lap Shear Strength, psi (MPa) | | |
|---|---|---|---|---|
| | | 75° F. (24° C.) | 180° F. (82° C.) | 200° F. (93° C.) |
| CYCOM ® 985 3K70P graphite/epoxy prepreg, 350° F. (177° C.) | None | 3440 (23.7) | 4600 (31.7) | 4430 (30.6) |
| | 30 days at 160° F. (71° C.), 100% RH | 3450 (23.8) | 3300 (22.8) | 3000 (20.7) |
| CYCOM ® 1827/6781 glass/epoxy prepreg, 350° F. (177° C.) | None | 2320 (16.0) | 2400 (16.6) | 2350 (16.2) |
| | 30 days at 160° F. (71° C.), 100% RH | 2150 (14.8) | 2000 (13.6) | 1900 (13.1) |
| CYCOM ® 919/3K70P graphite/epoxy prepreg, 250° F. (121° C.) | None | 3530 (24.3) | — | — |
| | 30 days at 160° F. (71° C.), 100% RH | 4350 (30.0) | — | — |

Table 5, provided below, summarizes specific information concerning secondary bonding of thermoplastic composite substrates for selected embodiments contemplated for the adhesive layers 76, 78.

TABLE 5

| Adhesive System | Precured Composite Substrate | Lap Shear Strength, psi (MPa) | | | |
|---|---|---|---|---|---|
| | | −67° F. (−55° C.) | 75° F. (24° C.) | 300° F. (149° C.) | 180° F. (82° C.) wet |
| FM 300 Adhesive 0.080 psf (391 gsm) | PEEK (APC ™-2) | 3080 (21.2) | 3660 (25.2) | 1940 (13.4) | 3220 (22.2) |
| FM 300-2K Adhesive 0.080 psf (391 gsm) | PEEK (APC ™-2) | 3100 (21.4) | 3650 (25.2) | 1820 (12.6) | 3170 (21.8) |

Table 6, provided below, includes selected KGR-1 strain data for the FM® 300K Film Adhesive (0.06 psf (293 gsm) with a BR® 127 Primer.

TABLE 6

| Test Temperature | Linear Limit (LL) | | | Knee (KN) | | Ultimate Failure (UL) | |
|---|---|---|---|---|---|---|---|
| | f | γ | G | f | γ | f | γ |
| 75° F. (24° C.) | 2060 (14.2) | 0.0156 | 131,500 (907.5) | 6100 (42.1) | 0.0932 | 7210 (49.8) | 0.5446 |
| 220° F. (104° C.) | 916 (6.32) | 0.0150 | 64,700 (446.2) | 3020 (20.8) | 0.0835 | 5190 (35.8) | 1.2073 |
| 220° F. (104° C.) | 745 (5.14) | 0.0273 | 27,500 (189.8) | 1880 (13.0) | 0.1047 | 3100 (21.4) | 1.0744 |

As should be apparent, the details for the adhesive layers 76, 78 that are provided above are not intended to be limiting of the present invention.

In particular, while the described embodiment is directed to an adhesive that incorporates epoxy resins, the adhesive layers 76, 78 of the present invention need not be an epoxy-resin-based material. To the contrary, any other suitable type of adhesive may be employed without departing from the scope of the present invention.

The present invention contemplates that the interleaf adhesive layers 80, 82 may be an FM® 300-2 Interleaf Adhesive layer. The following additional specifics are provided. These specifics are taken from the following technical data sheet: FM® 300-2 Interleaf Adhesive Technical Data Sheet from Cytec Engineered Materials, (undated), the contents of which are incorporated herein by reference.)

The FM® 300-2 Interleaf Adhesive is described as a high strain, low flow, modified, epoxy adhesive film developed to reduce shear stress concentrations in composite structures. The FM® 300-2 Interleaf Adhesive is designed to remain a discrete layer through the composite cure cycle. The FM® 300-2 Interleaf Adhesive is recommended for co-curing with most 250° F. to 350° F. (120° C. to 175° C.) epoxy-based advanced composites. The FM® 300-2 Interleaf Adhesive has a high viscosity with a weight, when in the form of a film, between 0.012 psf (59 gsm) to 0.08 psf (390 gsm).

Table 7, provided below, provides an overview of the nominal weight and thickness of selected embodiments for the interleaf adhesive layers 80, 82.

TABLE 7

| Product Number | Nominal Weight, psf (gsm) | Nominal Thickness, inches (mm) |
| --- | --- | --- |
| FM 300-2 Interleaf Adhesive | 0.030 (145) | 0.005 (0.13) |
| FM 300-2 Interleaf Adhesive | 0.050 (245) | 0.008 (0.20) |
| FM 300-2 Interleaf Adhesive | 0.080 (390) | 0.013 (0.33) |

Curing of the FM® 300-2 Interleaf Adhesive may be varied over a range from 225° F. to 350° F. (105° C. to 175° C.) with minimum pressure, which assures proper mating of the adjacent layers to be bonded together. After assembly of the adjacent layers, pressure may be applied at 40 psi (0.26 MPa) for 30 to 120 minutes at 250° F. (120° C.). Alternatively, pressure of 40 psi (0.26 MPa) may be applied for 60 minutes at 250° F. (120° C.).

Table 8, provided below, summarizes some of the mechanical performance characteristics of the FM® 300-2 Interleaf Adhesive that may be used for the interleaf adhesive layers 80, 82.

TABLE 8

| Test Condition | FM 300-2U Interleaf Adhesive 0.03 psf (145 gsm) | FM 300-2U Interleaf Adhesive 0.05 psf (245 gsm) |
| --- | --- | --- |
| Large Area Lap Shear Strength, psi (MPa) | | |
| −67° F. (−55° C.) | 4200 (29.0) | 5100 (35.2) |
| 75° F. (24° C.) | 5770 (39.8) | 6000 (41.4) |
| 250° F. (120° C.) | 3630 (25.0) | 4450 (30.7) |
| Boeing Climbing Drum Peel, in-lb/in (Nm/m) | | |
| −67° F. (−55° C.) | 18 (80) | 14 (62) |
| 75° F. (24° C.) | 37 (160) | 34 (150) |
| 250° F. (120° C.) | 39 (170) | 38 (170) |
| Nominal Flow, % | 75 | — |

Table 9, provided below, conveys selected information concerning co-cure data characteristics of the FM® 300-2 Interleaf Adhesive that may be used for the interleaf adhesive layers 80, 82.

Like the adhesive layers 76, 78, it is contemplated that the interleaf adhesive layers 80, 82 will be made from an epoxy resin. It is also contemplated that the interleaf adhesive layers 80, 82 may include one or more of 2-butanone, tetrabromobisphenol A, dicyandiamide, and diaminodiphenylsulfone. As should be apparent, these materials are merely exemplary of the types of materials that may be included in the interleaf adhesive layers 80, 82.

As should be apparent from the foregoing, one aspect of the interleaf adhesive layers 80, 82 of the present invention that is desirable is the viscosity of the interleaf adhesive layers 80, 82. In particular, it is contemplated that the interleaf adhesive layers 80, 82 will have a viscosity and/or permeability sufficient to prevent (or at least greatly discourage) the outgassing of water, air, and volatiles that may be present in any of the cells 64 of the honeycomb layer 62. An interleaf adhesive layer 80, 82 with sufficient viscosity is understood to be one that is capable of withstanding the pressures exerted thereon by entrapped water, air, and volatiles while discouraging the establishment of pores or cracks that might lead to the development of a chimney crack 52.

The interleaf adhesive layers 80, 82 of the present invention, therefore, are contemplated to have a viscosity of between about 1400-30,000 P (Poise) or more, which is its lowest measured value during the curing process. Once cured, the interleaf adhesive layers 80, 82 are contemplated to have a viscosity of between about 1,000,000-3,000,000 P or more.

It is noted that the viscosity of the interleaf adhesive layers 80, 82 is not constant when curing time and temperature are taken into account. After the interleaf adhesive layers 80, 82 are applied, but before being cured, the interleaf adhesive layers 80, 82 are expected to have an initial viscosity. During the curing process, as the interleaf adhesive layers 80, 82 are heated, the viscosity is contemplated to drop to a minimum value before the interleaf adhesive layers 80, 82 begin to solidify as a result of curing. At the end of the curing process, the interleaf adhesive layers 80, 82 are contemplated to have a maximum viscosity for the material when cured (or cross-linked). At this point, the interleaf adhesive layers 80, 82 essentially achieve the properties of a solid, because the interleaf adhesive layers 80, 82 are cured, whereupon they become cross-linked, or chemically bonded, with the resins (and other materials) in the layers immediately adjacent thereto.

As also should be apparent to those skilled in the art, before an adhesive (such as the adhesive employed for the interleaf adhesive layers 80, 82) cures, the adhesive is in a

TABLE 9

| Adhesive System | Prepreg System | Bonded Specimen Exposure | Wdie Area Lap Shear Strength, psi (MPa) | |
| --- | --- | --- | --- | --- |
| | | | 75° F. (24° C.) | 215° F. (104° C.) |
| FM ® 300M-2U Interleaf Adhesive 0.05 psf (245 gsm) | CYCOM ® 985/AS-4 - graphite/epoxy controlled flow system | None | 2720 (18.8) (Laminate Failure) | 2600 (17.9) (Laminate Failure) |
| | | 30 days at 140° F. (60° C.), 100% RH | 2040 (14.1) (Laminate Failure) | 2760 (19.0) (Laminate Failure) |
| FM ® 300-2U Interleaf Adhesive 0.012 psf (60 gsm) | CYCOM ® 985-1/AS-4 - graphite/epoxy high flow system | None | 3100 (21.4) (Laminate Failure) | 2880 (19.8) (Laminate Failure) |
| | | 30 days at 140° F. (60° C.), 100% RH | 3390 (23.4) (Laminate Failure) | 2800 (19.3) (Laminate Failure) | pre-gelled condition. At some point in the curing process, the adhesive used for the interleaf adhesive layers 80, 82 gels. The time from the pre-gelled condition to the gelled condition is referred to as the gel time.

For purposes of an adhesive, the rate at which the adhesive is heated (or cured) has an impact on the viscosity of the adhesive. In particular, as is true for the interleaf adhesive layers 80, 82 of the present invention, the higher the cure rate, the lower the viscosity. Since the viscosity of the interleaf adhesive layers 80, 82 contributes to the ability of the interleaf adhesive layers 80, 82 to avoid the formation of pores (and, therefore, to help the honeycomb core sandwich construction material 60 avoid the formation of chimney cracks 52), the cure rate is a variable of interest.

With respect to the interleaf adhesive layers 80, 82 of the present invention, therefore, it is contemplated that the interleaf adhesive layers 80, 82, at ambient temperature (about 75° F., 24 ° C.), will have a viscosity of about 20,000 P±3,000 P. If a cure rate of 1° F./min. (or 0.56° C./min.) is applied, the viscosity of the interleaf adhesive layers 80, 82 is contemplated to reduce to a minimum value of about 2200 P. As each interleaf adhesive layer 80, 82 cures, the viscosity increases to a value of about 2,600,000 P at the gel point. The gel time is contemplated, in this example, to be about 167 minutes (±10%).

If a cure rate of 3° F./min. (or 1.68° C./min.) is applied, the viscosity of the interleaf adhesive layers 80, 82 is contemplated to reduce from its initial value to a minimum value of about 1500 P. As the interleaf adhesive layers 80, 82 cure, the viscosity increases to a value of about 2,000,000 P at the gel point. The gel time is contemplated, in this example, to be about 127 minutes (±10%).

If a cure rate of 5° F./min. (or 2.80° C./min.) is applied, the viscosity of the interleaf adhesive layers 80, 82 is contemplated to reduce from its initial value to a minimum value of about 1420 P. As the interleaf adhesive layers 80, 82 cure, the viscosity increases to a value of about 2,000,000 P at the gel point. The gel time is contemplated, in this example, to be about 119 minutes (±10%).

In connection with each of the cure rates of 1-5° F./min. (0.56-2.80° C./min.), it is contemplated that the temperature will be raised to a suitable magnitude, such as about 200° F.±10° F. (93.33° C.±2.78° C.) and held at the suitable temperature for a period of time, permitting the material to cure. This time period is referred to as the "dwell" time period. During the dwell time, the interleaf adhesive layers 80, 82 co-cure along with the other layers. During curing, the viscosity of the interleaf adhesive layers 80, 82 increases. Holding the temperature at the dwell temperature allows the viscosity of the interleaf adhesive layers 80, 82 to increase without subjecting the interleaf adhesive layers 80, 82 to unwanted pressures due to the air, water, or volatiles that may be present in the material. While the dwell time depends upon a number of variables, typical dwell times are on the order of 90-120 minutes. Of course, the dwell time may be larger or smaller without departing from the scope of the present invention.

It is noted that, when these values are compared with a typical adhesive, such as the adhesive used for the adhesive layers 76, 78, the adhesive of the interleaf adhesive layers 80, 82 has a viscosity that is about three times (or more) higher than the adhesive of the adhesive layers 76, 78.

By comparison, therefore, if a cure rate of 1° F./min. (or 0.56° C./min.) is applied, the viscosity of the adhesive layers 76, 78 is contemplated to reduce, from an initial viscosity of about 50,000P±6,000 P) to a minimum value of about 580 P. As the adhesive layers 76, 78 cure, the viscosity increases to a value of about 1,000,000 P at the gel point. The gel time is contemplated, in this example, to be about 178 minutes (±10%).

If a cure rate of 3° F./min. (or 1.68° C./min.) is applied, the viscosity of the adhesive layers 76, 78 is contemplated to reduce from its initial value to a minimum value of about 510 P. As the adhesive layers 76, 78 cure, the viscosity increases to a value of about 1,000,000 P at the gel point. The gel time is contemplated, in this example, to be about 126 minutes (±10%).

If a cure rate of 5° F./min. (or 2.80° C./min.) is applied, the viscosity of the adhesive layers 76, 78 is contemplated to reduce from its initial value to a minimum value of about 480 P. As the adhesive layers 76, 78 cure, the viscosity increases to a value of about 1,000,000 P at the gel point. The gel time is contemplated, in this example, to be about 115 minutes (±10%).

The gel times for the adhesive layers 76, 78 and the interleaf adhesive layers 80, 82 preferably are matched, or closely related, to one another so that the adhesive layers 76, 78, 80, 82 cure at about the same time. This is preferred because, when the adhesive layers 76, 78, 80, 82 co-cure, they are understood to develop the strongest cross-linking bonds therebetween. As a result, the gel time for the interleaf adhesive layers 80, 82 is contemplated to be matched, or closely related, with the gel time for the adhesive layers 76, 78. Since the two materials are not contemplated to cure in exactly the same amount of time, it is preferred for the gel times to be within ±15%. It is more preferred for the gel times to be within 10%. Still further, it is preferred for the gel times to be within 7%, 6%, 5%, 4%, 3%, 2%, or 1%, with the lower differentials being preferred over the higher differentials.

It is noted that the adhesive layers 76, 78, 80, 82 are anticipated to be cured for a period of time after the gel point. This assures that the adhesive layers 76, 78, 80, 82 are fully cured before the honeycomb core sandwich construction material 60 is withdrawn from the furnace (or other heating device, such as an autoclave), where the curing takes place. The viscosity of the adhesive layers 76, 78, 80, 82 is contemplated to increase to a higher value with additional heating after the gel point, as should be apparent to those skilled in the art.

As noted above, the interleaf adhesive layers 80, 82 have a minimum viscosity during the curing cycle that is about three times (or more) higher than the minimum viscosity of the adhesive layers 76, 78. It is preferred that the minimum viscosity of the interleaf adhesive layers 80, 82 be at least two times greater than the minimum viscosity of the adhesive layers 76, 78. In another embodiment, as indicated above, the difference is about three times. In still another embodiment, the difference is more than three times.

Figure 9:
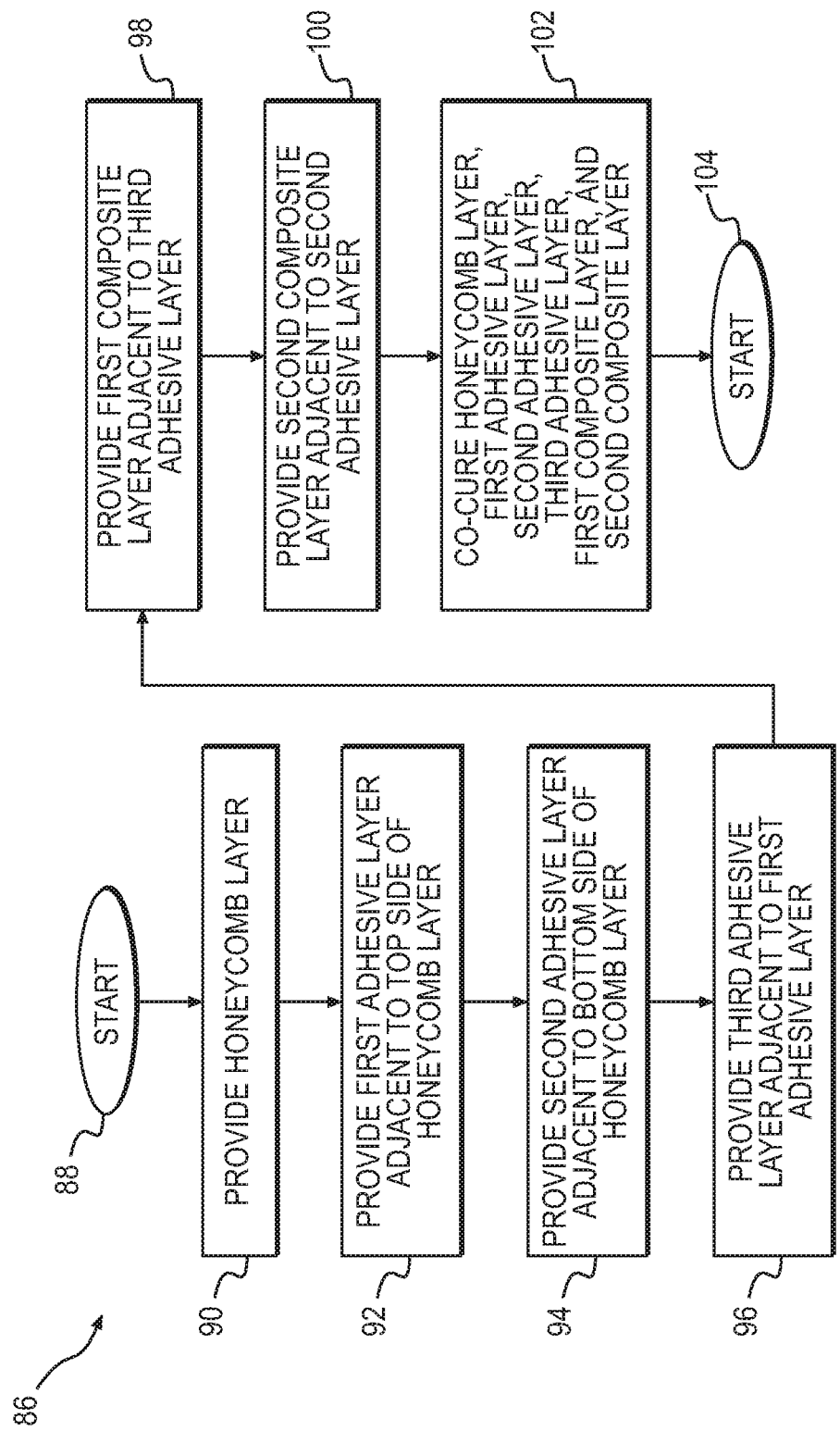
FIG. 9 is a flow chart summarizing a first method of manufacturing a composite material according to the present invention.

FIG. 9 illustrates a first method 86 for the manufacture of a composite material, specifically a variant of the honeycomb core sandwich construction material 60, according to the present invention.

The method 86 begins at 88.

The method 86 proceeds to step 90, where the honeycomb layer 62 is provided.

The method 86 proceeds to step 92 where a first adhesive layer is provided adjacent to the top side of the honeycomb layer 62. The first adhesive layer may be, for example, the top adhesive layer 76.

The method 86 then proceeds to step 94, where a second adhesive layer is provided adjacent to the bottom side of the honeycomb layer 62. This second adhesive may be, for example, the bottom adhesive layer 78.

The method 86 proceeds to step 96, where a third adhesive layer is provided adjacent to the first adhesive layer. In this step 96, for example, the top interleaf adhesive layer 80 is provided adjacent to the top adhesive layer 76.

The method 86 proceeds to step 98. At step 98, a first composite layer is provided adjacent to the third adhesive layer. Specifically, it is contemplated that the top carbon fiber laminate layer 72 is provided adjacent to the top interleaf adhesive layer 80.

At step 100, the method 86 includes the step of providing a second composite layer adjacent to the second adhesive layer. For example, at this step, the bottom composite fiber laminate layer 74 is provided adjacent to the bottom adhesive layer 78.

The method 86 then proceeds to step 102. At step 102, the honeycomb layer, the first adhesive layer, the second adhesive layer, the third adhesive layer, the first composite layer, and the second composite layer are co-cured. Consistent with the discussion above, the co-curing is effectuated with respect to the honeycomb layer 62, the adhesive layers 76, 78, the top interleaf adhesive layer 80, and the carbon fiber laminate layers 72, 74.

The method 86 ends at step 104.

Figure 10:
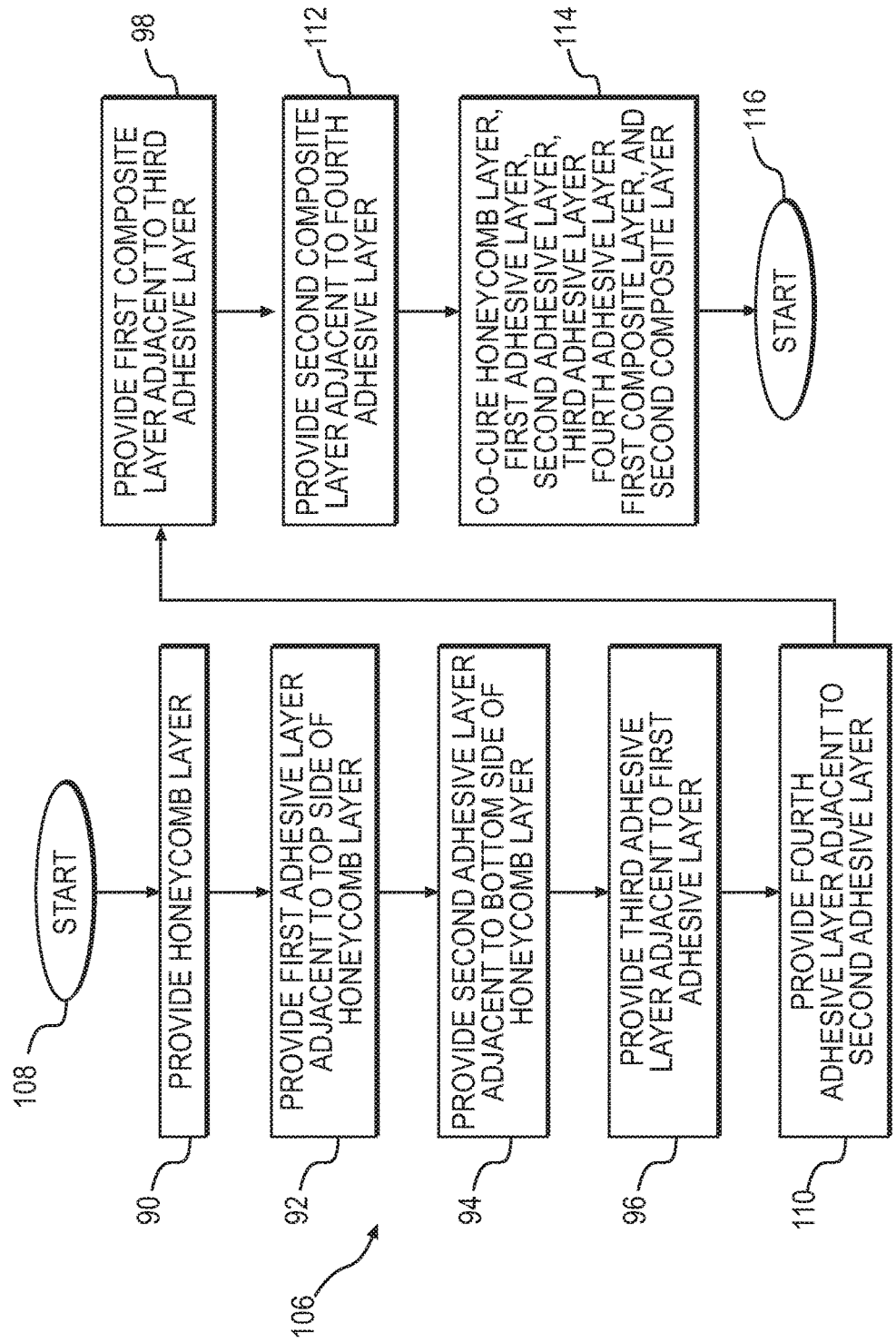
FIG. 10 is a flow chart summarizing a second method of manufacturing a composite material according to the present invention.

FIG. 10 illustrates a second method 106 for the manufacture of a composite material, specifically the honeycomb core sandwich construction material 60 according to the present invention.

The method 106 shares many of the steps of the method 86. The method 106 differs from the method 86 in that a second interleaf adhesive layer is added. In particular, the method 106 includes the provision of a bottom interleaf adhesive layer 82, as discussed below. Like steps in the method 106 share reference numbers with like steps in the method 86.

The method 106 begins at 108.

The method 106 proceeds to step 90, where the honeycomb layer 62 is provided.

The method 106 proceeds to step 92 where a first adhesive layer is provided adjacent to the top side of the honeycomb layer 62. The first adhesive layer may be, for example, the top adhesive layer 76.

The method 106 then proceeds to step 94, where a second adhesive layer is provided adjacent to the bottom side of the honeycomb layer 62. This second adhesive may be, for example, the bottom adhesive layer 78.

The method 106 proceeds to step 96, where a third adhesive layer is provided adjacent to the first adhesive layer. In this step 96, for example, the top interleaf adhesive layer 80 is provided adjacent to the top adhesive layer 76.

The method 106 then proceeds to step 110. Here, a fourth adhesive layer is provided adjacent to the second adhesive layer. In the context of the present invention, the fourth adhesive layer is, for example, the bottom interleaf adhesive layer 82. As noted, the second adhesive layer is the bottom adhesive layer 78.

The method 106 proceeds to step 98. At step 98, a first composite layer is provided adjacent to the third adhesive layer. Specifically, it is contemplated that the top carbon fiber laminate layer 72 is provided adjacent to the top interleaf adhesive layer 80.

At step 112, the method 106 includes the step of providing a second composite layer adjacent to the fourth adhesive layer. For example, at this step, the bottom composite fiber laminate layer 74 is provided adjacent to the bottom interleaf adhesive layer 82.

The method 86 then proceeds to step 114. At step 114, the honeycomb layer, the first adhesive layer, the second adhesive layer, the third adhesive layer, the fourth adhesive layer, the first composite layer, and the second composite layer are co-cured. Consistent with the discussion above, the co-curing is effectuated with respect to the honeycomb layer 62, the adhesive layers 76, 78, the interleaf adhesive layer 80, 82, and the carbon fiber laminate layers 72, 74.

The method 106 ends at step 116.

As should be apparent from the foregoing, the steps in the methods 86, 106 are contemplated to be performed in any order suitable for the construction of the honeycomb core sandwich construction material 60. While any particular order may be employed, it is contemplated that the honeycomb core sandwich construction material 60 will be built up in a series of layers from the bottom-most layer to the top-most layer. Alternatively, the honeycomb core sandwich construction material 60 may be constructed from the top-most layer to the bottom-most layer. In a further contemplated embodiment, the honeycomb core sandwich construction material 60 is manufactured outwardly from the honeycomb material 62.

In a further contemplated embodiment, the layers may be pre-assembled and subsequently co-cured. If so, as noted above, it is contemplated that the pre-assembled sandwich of layers will be heated at a rate of between 1° F./min and 5° F./min in order to arrive at the composite material. During the curing, it is contemplated that the first adhesive layer and the third adhesive layer have gel times that are within 10% of each other. Moreover, it is contemplated that the minimum viscosity of the first adhesive layer will be at least half of the minimum viscosity of the third adhesive layer.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A composite material, comprising:
   a honeycomb layer with top and bottom sides, the honeycomb layer including a plurality of walls defining a plurality of cells therein;
   a first adhesive layer disposed adjacent to the top side of the honeycomb layer;
   a second adhesive layer disposed adjacent to the bottom side of the honeycomb layer;
   a third adhesive layer disposed adjacent to the first adhesive layer on the top side of the honeycomb layer;
   a first composite layer disposed adjacent to the third adhesive layer on the top side of the honeycomb layer; and
   a second composite layer disposed adjacent to the second adhesive layer on the bottom side of the honeycomb layer,
   wherein at least the third adhesive layer prevents penetration of the first composite layer by gas pressure in the cells, and substantially prevents the creation of channels within the first composite layer when co-cured, and
   wherein the first composite layer is in contact with the third adhesive layer.

2. The composite material of claim 1, further comprising a fourth adhesive layer positioned between the second adhesive layer and the second composite layer on the bottom side of the honeycomb layer, wherein the fourth adhesive layer prevents penetration of the second composite layer by gas pressure in the cells, and substantially prevents the creation of channels within the second composite layer when co-cured.

3. The composite material of claim 2, wherein, once cured, the third adhesive layer forms a chemical bond with the first adhesive layer.

4. The composite material of claim 2, wherein, once cured, the fourth adhesive layer forms a chemical bond with the second adhesive layer.

5. The composite material of claim 4, wherein the second composite layer is in contact with the fourth adhesive layer.

6. The composite material of claim 2, wherein the third and fourth adhesive layers comprise 2-butanone, tetrabromobisphenol A, epoxy resins, dicyandiamide, and diaminodiphenylsulfone.

7. The composite material of claim 2, wherein the third and fourth adhesive layers are film adhesives.

8. The composite material of claim 2, wherein the third and fourth adhesive layers have a cure temperature of about 225-350° F. (105-175° C.).

9. The composite material of claim 2, wherein the third and fourth adhesive layers have a weight of between about 0.030-0.080 psf (145-390 gsm) and a thickness of between about 0.005-0.013 inches (0.13-0.33 mm).

10. The composite material of claim 2, wherein the third and fourth adhesive layers have a weight between about 0.03-0.05 psf (145-245 gsm).

11. The composite material of claim 10, wherein the third and fourth adhesive layers have a lap shear strength of between about 5770-6000 psi (39.8-41.4 MPa) at 75° F. (24° C.).

12. The composite material of claim 2, wherein the third and fourth adhesive layers are compositionally identical.

13. The composite material of claim 2, wherein the third and fourth adhesive layers have a minimum viscosity during a cure cycle of about 2200 P when heated at a rate of 1° F./min. (0.56° C./min.).

14. The composite material of claim 13, wherein the third and fourth adhesive layers have a gel time of about 167 min. ±10%.

15. The composite material of claim 2, wherein the third and fourth adhesive layers have a minimum viscosity during a cure cycle of about 1500 P when heated at a rate of 3° F./min. (or 1.68° C./min.).

16. The composite material of claim 15, wherein the third and fourth adhesive layers have a gel time of about 127 min. ±10%.

17. The composite material of claim 2, wherein the third and fourth adhesive layers have a minimum viscosity during a cure cycle of about 1420 P when heated at a rate of 5° F./min. (or 2.80° C./min.).

18. The composite material of claim 17, wherein the third and fourth adhesive layers have a gel time of about 119 min. ±10%.

19. The composite material of claim 1, wherein the first adhesive layer is in contact with the top side of the honeycomb layer.

20. The composite material of claim 1, wherein the second adhesive layer is in contact with the bottom side of the honeycomb layer.

21. The composite material of claim 1, wherein the wall of the honeycomb layer comprise aramid fibers suspended in a resin matrix.

22. The composite material of claim 1, wherein the first composite layer and the second composite layer comprise carbon fibers suspended in a resin matrix.

23. The composite material of claim 22, wherein the carbon fibers are woven into multiple layers of carbon fiber fabric stacked onto one another.

24. The composite material of claim 1, wherein the first and second adhesive layers are compositionally identical.

25. The composite material of claim 1, wherein the first adhesive layer gels at a first time period and the third adhesive layer gels at a second time period, wherein the first time period and the second time period are within a range of at least one of ±15%, ±10%, ±7%, ±6%, ±5%, ±4%, ±3%, ±2%, or ±1% of one another.

26. The composite material of claim 1, wherein the first adhesive layer has a first minimum viscosity during a curing cycle, the third adhesive layer has a second minimum viscosity during the curing cycle, and the second minimum viscosity is at least twice as large as the first minimum viscosity.

* * * * *